(12) United States Patent
Baba et al.

(10) Patent No.: US 11,370,534 B2
(45) Date of Patent: Jun. 28, 2022

(54) FLYING DEVICE

(71) Applicants: DENSO CORPORATION, Kariya (JP); SOKEN, INC., Nisshin (JP)

(72) Inventors: Hiroyasu Baba, Nisshin (JP); Takenori Matsue, Nisshin (JP); Koji Kawasaki, Nisshin (JP); Naoya Kato, Kariya (JP)

(73) Assignees: DENSO CORPORATION, Kariya (JP); SOKEN, INC., Nisshin (JP)

(*) Notice: Subject to any disclaimer, the term of this patent is extended or adjusted under 35 U.S.C. 154(b) by 601 days.

(21) Appl. No.: 16/280,073

(22) Filed: Feb. 20, 2019

(65) Prior Publication Data
US 2019/0176979 A1    Jun. 13, 2019

Related U.S. Application Data

(63) Continuation of application No. PCT/JP2017/026504, filed on Jul. 21, 2017.

(30) Foreign Application Priority Data

Aug. 22, 2016 (JP) .............................. JP2016-161946
Jun. 20, 2017 (JP) .............................. JP2017-120387

(51) Int. Cl.
| | | |
|---|---|---|
| *B64C 27/57* | (2006.01) | |
| *B64C 27/80* | (2006.01) | |
| *B64C 39/02* | (2006.01) | |
| *B64C 27/52* | (2006.01) | |

(52) U.S. Cl.
CPC .............. *B64C 27/57* (2013.01); *B64C 27/52* (2013.01); *B64C 27/80* (2013.01); *B64C 39/024* (2013.01); *B64C 2201/108* (2013.01); *B64C 2201/141* (2013.01)

(58) Field of Classification Search
CPC ........ B64C 2201/027; B64C 2201/108; B64C 2201/141; B64C 27/52; B64C 27/57; B64C 27/59; B64C 27/08; B64C 27/80; B64C 39/024; B64D 31/10
See application file for complete search history.

(56) References Cited

U.S. PATENT DOCUMENTS

| | | | | |
|---|---|---|---|---|
| 3,002,712 A | * | 10/1961 | Beckwith | ................ B64C 27/20 244/17.23 |
| 9,242,714 B2 | * | 1/2016 | Wang | .................... B64C 39/024 |
| 9,388,794 B2 | * | 7/2016 | Weddendorf | ............. F03D 5/00 |

(Continued)

FOREIGN PATENT DOCUMENTS

JP    2002347698 A    12/2002

*Primary Examiner* — Medhat Badawi
(74) *Attorney, Agent, or Firm* — Harness, Dickey & Pierce, P.L.C.

(57) ABSTRACT

A flying device includes a base, thrusters, an orientation detection unit, an abnormality detection unit, and an orientation control unit. The plurality of thrusters are provided on the base each including a propeller, a motor which drives the propeller, and a pitch change mechanism unit which changes a pitch of the propeller. The orientation detection unit detects an orientation of the base. The abnormality detection unit detects an abnormality in the thrusters. The orientation control unit, when the abnormality detection unit detects an abnormality in at least one of the thrusters, changes the pitches of the propellers in the remaining thrusters to maintain an orientation of the base detected by the orientation detection unit.

10 Claims, 17 Drawing Sheets

(56) References Cited

U.S. PATENT DOCUMENTS

| | | | | |
|---|---|---|---|---|
| 2006/0266881 A1* | 11/2006 | Hughey | B64C 27/08 | 244/17.23 |
| 2013/0112804 A1* | 5/2013 | Zhu | B64C 3/56 | 244/2 |
| 2016/0023755 A1* | 1/2016 | Elshafei | G08G 5/025 | 244/17.13 |
| 2016/0107751 A1* | 4/2016 | D'Andrea | B64C 27/08 | 701/4 |
| 2016/0122018 A1* | 5/2016 | Matsue | G05D 1/0858 | 244/17.13 |
| 2016/0137298 A1* | 5/2016 | Youngblood | B64C 39/024 | 244/17.23 |
| 2016/0236790 A1* | 8/2016 | Knapp | G08G 5/0052 | |
| 2016/0272312 A1* | 9/2016 | Mallard | B64C 29/0033 | |
| 2016/0311526 A1* | 10/2016 | Geise | B64C 27/14 | |
| 2017/0036762 A1* | 2/2017 | Gamble | B64C 27/08 | |
| 2017/0158342 A1* | 6/2017 | Ishii | B64C 27/08 | |
| 2017/0203839 A1* | 7/2017 | Giannini | B64D 27/24 | |
| 2017/0253329 A1* | 9/2017 | Champagne, Jr. | B64C 39/024 | |
| 2017/0253332 A1* | 9/2017 | Champagne, Jr. | B64C 39/02 | |
| 2018/0044013 A1* | 2/2018 | Groninga | B64C 29/0033 | |
| 2018/0057157 A1* | 3/2018 | Groninga | B64C 39/008 | |
| 2018/0134400 A1* | 5/2018 | Knapp | G08G 5/0086 | |
| 2018/0244377 A1* | 8/2018 | Chan | B64C 27/12 | |
| 2018/0354623 A1* | 12/2018 | Bhat | B64C 27/10 | |
| 2019/0144116 A1* | 5/2019 | Yuan | B64C 27/20 | 701/3 |
| 2019/0176979 A1* | 6/2019 | Baba | B64C 27/80 | |

* cited by examiner

FLYING DEVICE

CROSS REFERENCE TO RELATED APPLICATIONS

The present application is a continuation application of International Patent Application No. PCT/JP2017/026504 filed on Jul. 21, 2017, which designated the United States and claims the benefit of priority from Japanese Patent Application No. 2016-161946 filed on Aug. 22, 2016 and Japanese Patent Application No. 2017-120387 filed on Jun. 20, 2017.

TECHNICAL FIELD

The present disclosure relates to a flying device.

BACKGROUND

A flying device, such as a so-called drone, typically includes a drive mechanism that generates thrust, such as a plurality of thrusters. During operation, an abnormality may occur in the drive mechanism, and a correction may be required to ensure stable flight continues.

SUMMARY

According to one aspect of the present disclosure, a flying device may include a base, thrusters, an orientation detection unit, an abnormality detection unit, and an orientation control unit. The plurality of thrusters are provided on the base each including a propeller, a motor which drives the propeller, and a pitch change mechanism unit which changes a pitch of the propeller. The orientation detection unit detects an orientation of the base. The abnormality detection unit detects an abnormality in the thrusters. The orientation control unit, when the abnormality detection unit detects an abnormality in at least one of the thrusters, changes the pitches of the propellers in the remaining thrusters to maintain an orientation of the base detected by the orientation detection unit.

DETAILED DESCRIPTION

Figure 1:
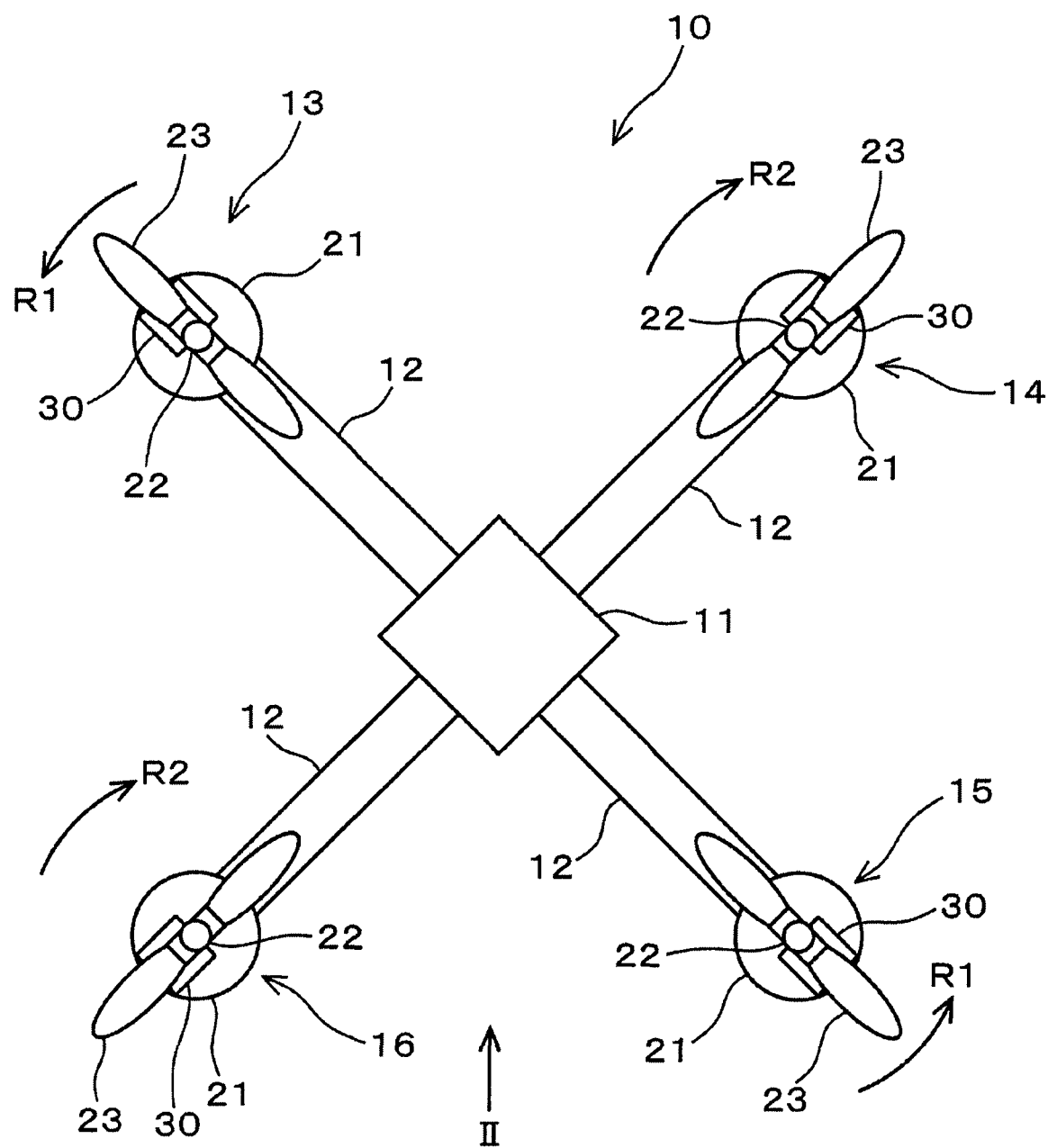
FIG. 1 is a schematic diagram showing a flying device according to a first embodiment.

Hereinafter, a plurality of embodiments of a flying device will be described with reference to the drawings. In the plurality of embodiments, substantially the same components are denoted by identical reference numerals, and repetitive descriptions will be omitted.

First Embodiment

Figure 2:
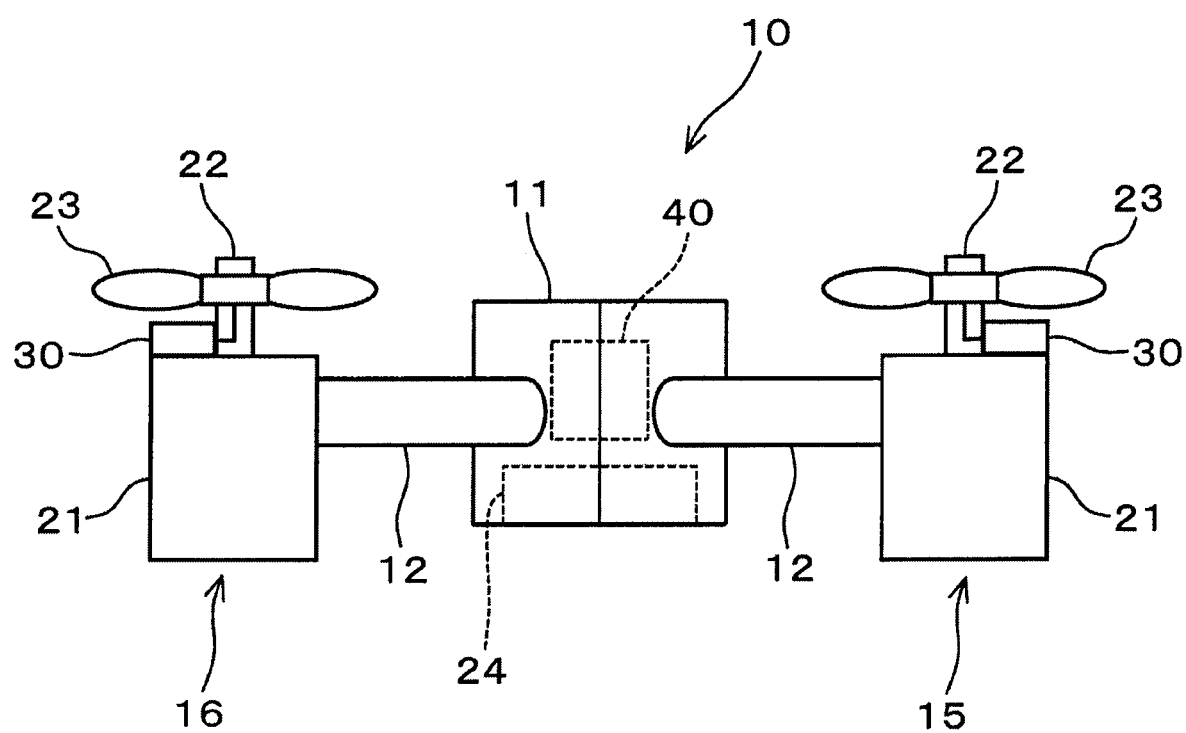
FIG. 2 is a schematic view of the flying device according to the first embodiment as viewed from a direction of an arrow II in FIG. 1.

As shown in FIGS. 1 and 2, a flying device 10 includes a base 11, arm portions 12, a thruster 13, a thruster 14, a thruster 15, and a thruster 16. The base 11 is provided at a position of the center of gravity of the flying device 10. The arm portions 12 extend radially outward from the base 11. The thrusters 13 to 16 are provided at tips of the respective arm portions 12, that is, at the end portions of the respective arm portions 12 opposite to the base 11. The four arm portions 12 extend symmetrically across the base 11. In other words, the arm portions 12 sandwiching the base 11 extend symmetrically in pairs on the same straight line including the center of gravity of the base 11. In the present embodiment, an example in which the four thrusters 13 to 16 are provided around the arm portions 12 will be described. The arm portions 12 and the thrusters 13 to 16 are not limited to four, and any number of four or more may be set.

Each of the thrusters 13 to 16 includes a motor 21, a drive shaft member 22, and a propeller 23. The motor 21 is a driving source for driving the propeller 23, and uses, for example, a battery 24 accommodated in the base 11 as a power source. The drive shaft member 22 transmits the rotation of the motor 21 to the propeller 23. The propeller 23 extends radially outward from the drive shaft member 22. The pair of thrusters 13 and 15 provided symmetrically with respect to the base 11 have the same rotation direction R1 of the propellers 23. The pair of thrusters 14 and 16 have the same rotation direction R2 of the propellers 23. The rotation direction R1 of the propellers 23 in the thruster 13 and the thruster 15 and the rotation direction of the propeller 23 in the thruster 14 and the thruster 16 are set in opposite directions to each other.

This is because when the propellers 23 of the multiple thrusters 13 to 16 rotate in the same direction, a rotating force about a yaw axis is generated in the flying device 10 by a generated torque. The rotation direction R1 of the propellers 23 in the thruster 13 and the thruster 15 and the rotation direction R2 of the propellers 23 in the thruster 14 and the thruster 16 are set in opposite directions, to thereby cancel the rotating force about the yaw axis. As described above, the thruster 13 and the thruster 15, and the thruster 14 and the thruster 16 are set to have the rotation directions of the propellers 23 opposite to each other. The multiple thrusters 13 to 16 each have the pitch change mechanism unit 30.

Figure 3:
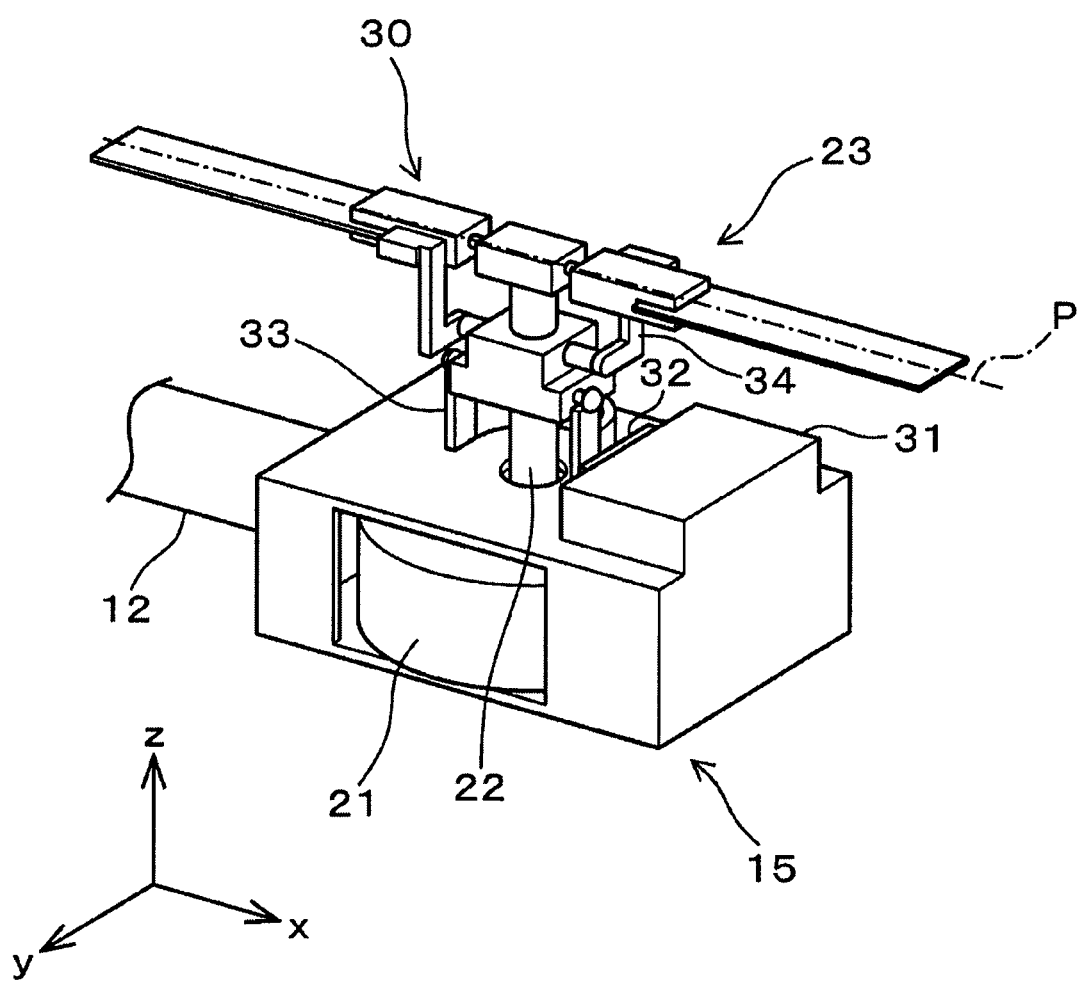
FIG. 3 is a schematic perspective view showing an example of a pitch change mechanism unit of the flying device according to the first embodiment.

An example of the pitch change mechanism unit 30 will be described with reference to FIG. 3. The pitch change mechanism unit 30 shown in FIG. 3 is an example in which the pitch change mechanism unit 30 is provided in the thruster 15, but the pitch change mechanism unit 30 is not limited to this example as long as the pitch of the propellers 23 can be changed and the pitch change mechanism 30 can be applied to the thrusters 13 to 16 of the flying device 10.

The pitch change mechanism unit 30 includes a servomotor 31, a lever member 32, a link member 33, and a changing member 34. The pitch change mechanism unit 30 changes the pitch of the propeller 23. The rotation of the servomotor 31 is transmitted to the propeller 23 through the lever member 32, the link member 33, and the changing member 34. At that time, the rotation of the servomotor 31 is converted into the rotation of the propeller 23 about a propeller axis P perpendicular to the drive shaft member 22 after passing through the lever member 32, the link member 33, and the changing member 34. In other words, when the servomotor 31 rotates, the propeller 23 provided at a tip of the drive shaft member 22 rotates about the propeller axis P.

Figure 4:
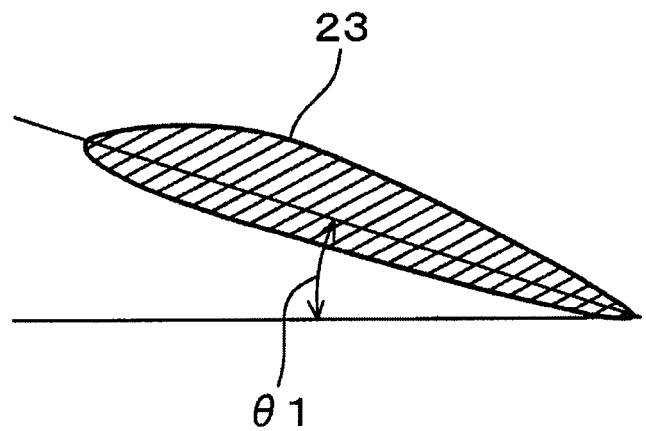
FIG. 4 is a schematic cross-sectional view showing a propeller of the flying device according to the first embodiment.
Figure 5:
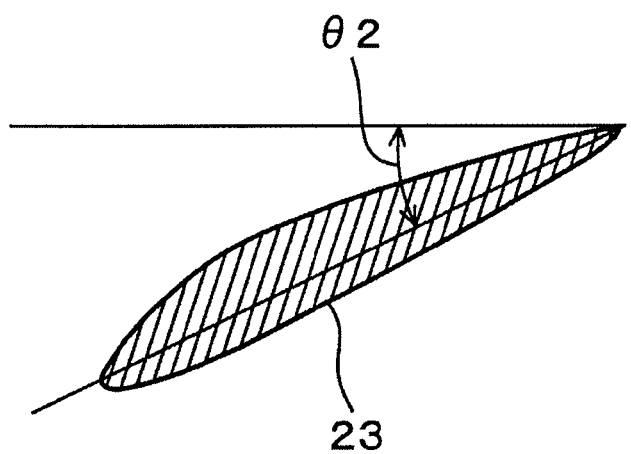
FIG. 5 is a schematic cross-sectional view showing the propeller of the flying device according to the first embodiment.

As a result, the propeller 23 changes between a pitch angle θ1 for generating an upward thrust shown in FIG. 4 and a pitch angle θ2 for generating a downward thrust shown in FIG. 5. An intermediate position between the pitch angle θ1 and the pitch angle θ2 of the propeller 23 is a neutral position at which no propulsive force is generated even when the propeller 23 rotates. When the pitch of the propeller 23 changes from the pitch angle θ2 toward the pitch angle θ1, the pitch of the propeller 23 changes to a positive side where the propulsive force in an ascending direction increases. On the other hand, when the pitch of the propeller 23 changes from the pitch angle θ1 toward the pitch angle θ2, the pitch of the propeller 23 changes to a negative side where the propulsive force in the ascending direction decreases. The amount of change in the pitch of the propeller 23 corresponds to a rotation angle of the servomotor 31.

Figure 6:
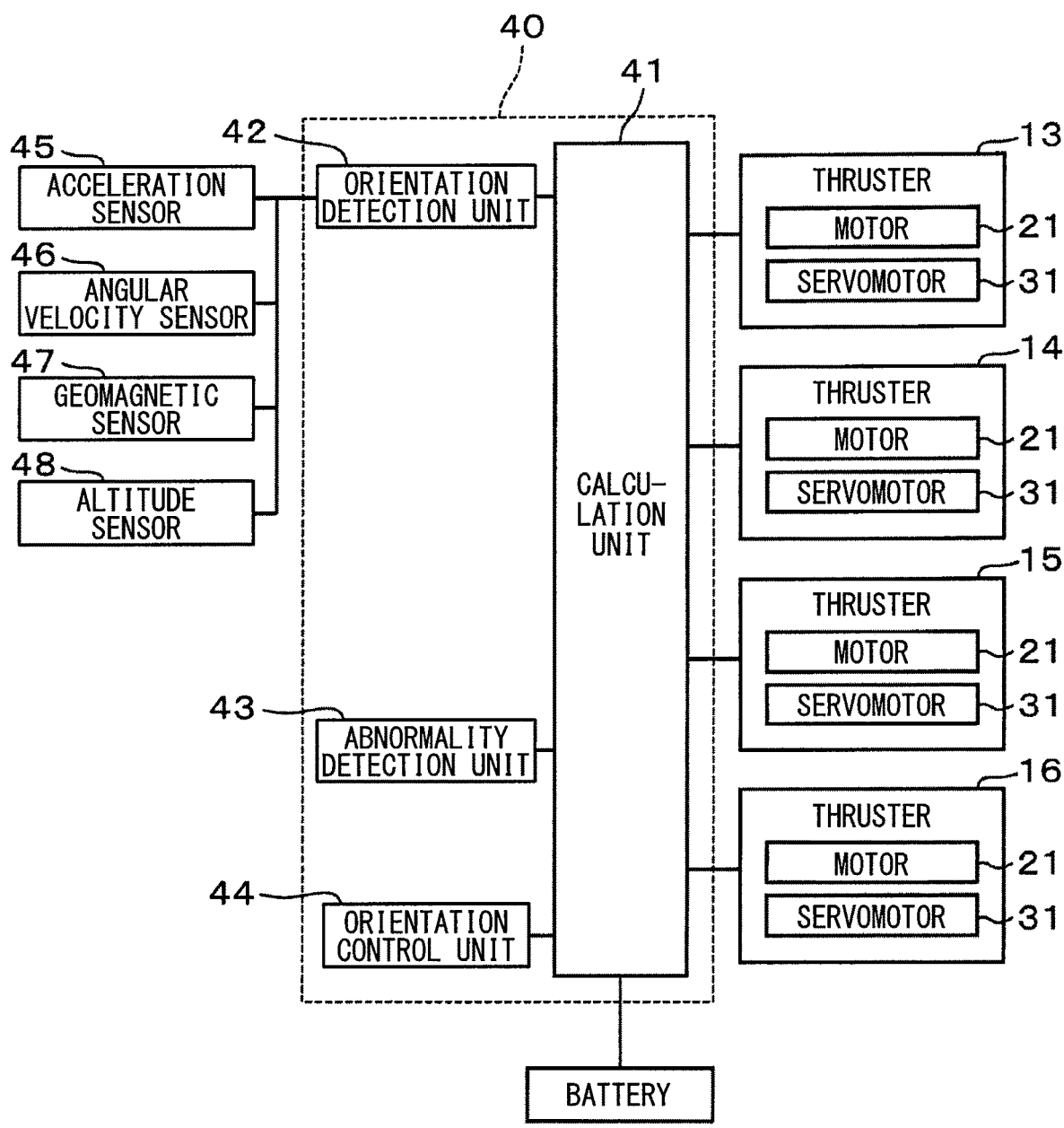
FIG. 6 is a block diagram showing a configuration of the flying device according to the first embodiment.

As shown in FIG. 2, the flying device 10 includes a control unit 40. The control unit 40 is housed inside the base 11 and connected to the battery 24. As shown in FIG. 6, the control unit 40 includes a calculation unit 41. The calculation unit 41 is a microcomputer having a CPU, a ROM, and a RAM, and controls the overall flying device 10. The calculation unit 41 executes a computer program stored in the ROM, to thereby implement the orientation detection unit 42, the abnormality detection unit 43, and the orientation control unit 44 as software. The orientation detection unit 42, the abnormality detection unit 43, and the orientation control unit 44 may be implemented by hardware or by cooperation of hardware and software.

The orientation detection unit 42 detects an orientation of the flying device 10 based on an inclination of the base 11, an acceleration applied to the base 11, and the like. Specifically, the orientation detection unit 42 is connected to an acceleration sensor 45, an angular velocity sensor 46, a geomagnetic sensor 47, and an altitude sensor 48.

The acceleration sensor 45 detects accelerations in three axial directions of an x-axis, a y-axis, and a z-axis. The angular velocity sensor 46 detects angular velocities in three axial directions in three dimensions. The geomagnetic sensor 47 detects a geomagnetism in three axial directions in three dimensions. The altitude sensor 48 detects an altitude in one axial direction in the vertical direction according to, for example, a change in the atmospheric pressure. The orientation detection unit 42 detects a flight orientation and a flight altitude of the flying device 10 according to an acceleration detected by the acceleration sensor 45, an angular velocity detected by the angular velocity sensor 46, a geomagnetism detected by the geomagnetic sensor 47, and an altitude detected by the altitude sensor 48.

The abnormality detection unit 43 detects abnormalities in the thrusters 13 to 16. Specifically, the abnormality detection unit 43 detects abnormality of the motors 21 and the propellers 23 of the thrusters 13 to 16. The abnormality detection unit 43 may detect, for example, a current supplied to the motor 21 of each of the thrusters 13 to 16, the rotational speed of the motor 21, a temperature of the motors 21, or the like.

The abnormality detection unit 43 determines whether or not the detected value is within a normal range based on the detected values of the motor 21. The abnormality detection unit 43 determines that the motors 21 or the propellers 23 of the thrusters 13 to 16 has an abnormality when the current, the rotational speed, the temperature, or the like of the motor 21 corresponding to the command value is not within a preset range.

Furthermore, the abnormality detection unit 43 may detect the abnormality of the thrusters 13 to 16 based on an abrupt change in the flight orientation of the flying device 10 detected by the orientation detection unit 42, in addition to the current, the rotational speed, the temperature or the like of the motor 21. The abnormality detection unit 43 may detect an abnormality of the thrusters 13 to 16 by acquiring a change in the flight orientation of the flying device 10 from an image captured by a camera (not shown) mounted on the flying device 10, for example. Further, the abnormality detection unit 43 may acquire a change in the flight orientation of the flying device 10 from a device or an image for monitoring the flight of the flying device 10 outside the flying device 10 to detect abnormality in the thrusters 13 to 16.

The orientation control unit 44 controls the thrusters 13 to 16 based on the orientation of the flying device 10 detected by the orientation detection unit 42. In other words, the orientation control unit 44 controls the rotational speed of the motor 21 in the thrusters 13 to 16 and the current supplied to the motor 21 to control the output of the motor 21. The orientation control unit 44 is connected to the pitch change mechanism units 30 of the thrusters 13 to 16. As a result, the orientation control unit 44 drives the servomotor 31 of the pitch change mechanism unit 30 to change the pitch of the propeller 23.

When the abnormality detection unit 43 detects an abnormality in any of the four thrusters 13 to 16, the orientation control unit 44 changes the pitch of the propellers 23 in the remaining thrusters 13 to 16. Specifically, it is assumed that an abnormality has occurred in one thruster 13 of the four thrusters 13 to 16. At that time, the thruster 13 in which the abnormality has occurred is defined as an abnormal thruster. The flying device 10 includes the thruster 15 at a position symmetrical to the thruster 13, which is an abnormal thruster, across the base 11. The thruster 15 at the symmetrical position is defined as a symmetrical thruster. When an abnormality is detected in the thruster 13, which is an abnormal thruster, the orientation control unit 44 changes the pitch of the propeller 23 in the thruster 15, which is the symmetrical thruster.

A relationship between the thruster 13 in which the abnormality has occurred and the thruster 15 in the symmetrical position does not have to be strictly symmetrical across the base 11. For example, in the case of the flying device 10 having five arm portions 12, there is no thruster at a position symmetrical to the thruster 13 in which the abnormality has occurred. In such a case, the thruster substantially symmetrical, i.e., closest to the position symmetrical to the thruster 13 in which the abnormality has occurred across the base 11 can be defined as the symmetrical thruster. Similarly, in the case of the flying device 10 having many arm portions 12, such as eight arm portions or ten arm portions, a thruster adjacent to a thruster in the symmetrical position, rather than the thruster in a position strictly symmetrical to the thruster 13 in which the abnormality has occurred, is also substantially symmetrical and therefore may also be defined as a symmetrical thruster.

The orientation control unit 44 changes at least the pitch of the propeller 23 in the thruster 15, which is the symmetrical thruster in the position symmetrical to the thruster 13, which is the abnormal thruster, in this manner. The orientation control unit 44 also controls the output of the motor 21 in the thruster 15 which is the symmetrical thruster. Further, the orientation control unit 44 controls the pitch of the propellers 23 and the output of the motors 21 in not only the thruster 15, which is the symmetrical thruster, but also the remaining normal thrusters 14 and 16.

Hereinafter, a flow of control of the flying device 10 will be described with reference to FIG. 7. In the example described in the following embodiment, it is assumed that the thruster 13 shown in FIG. 1 is the abnormal thruster, and the thruster 15 is the symmetrical thruster.

In Step S101, when the flying device 10 is in flight, the abnormality detection unit 43 detects whether or not the thrusters 13 to 16 are abnormal (S101). In other words, the abnormality detection unit 43 detects whether or not an abnormality has occurred in any of the four thrusters 13 to 16. The abnormality detection unit 43 detects the abnormality of the thrusters 13 to 16 based on, for example, the currents supplied to the motors 21 of the four thrusters 13 to 16, the rotational speeds of the motors 21, the temperatures of the motors 21, and the like.

When the abnormality of the thruster 13 is detected by the abnormality detection unit 43 in S101 (YES in S101), the orientation control unit 44 determines whether or not the flying device 10 is ascending or maintaining the altitude, that is, hovering (S102). In other words, the orientation control unit 44 determines whether or not the flying device 10 is ascending while increasing the altitude, or is hovering while maintaining the altitude of the flying device 10.

When the abnormality of the thrusters 13 to 16 is not detected by the abnormality detection unit 43 in S101 (NO in S101), the orientation control unit 44 continues the detection of the abnormality in S101 until the flight of the flying device 10 is completed.

When it is determined that the flying device 10 is ascending or hovering in S102 (YES in S102), the orientation control unit 44 stops the motor 21 of the thruster 13 which is the abnormal thruster (S103). In Step S104, the orientation control unit 44 changes the pitch of the propeller 23 in the thruster 15, which is the symmetrical thruster located at a position symmetrical to the thruster 13, to the negative side (S104). In other words, the orientation control unit 44 changes the pitch of the propeller 23 in the thruster 15, which is the symmetrical thruster, to the negative side where the propulsive force in an ascending direction decreases.

As described above, when an abnormality is detected by the thruster 13 during ascending or hovering, the orientation control unit 44 changes the pitch of the propeller 23 in the thruster 15 at the position symmetrical to the thruster 13 to the negative side. As a result, the propulsive force generated by the thruster 15, which is the symmetrical thruster, is adjusted by changing the pitch of the propeller 23.

When an abnormality occurs in any of the multiple thrusters 13 to 16 of the flying device 10, the thruster 13 in which the abnormality occurs stops. For that reason, in the flying device 10, the propulsive force generated by the thrusters 13 to 16 is unbalanced, which causes a sudden change in the flight orientation. In order to reduce the sudden change in the flight orientation, when the thruster 15 at the position symmetrical to the stopped thruster 13 is stopped, the total propulsive force of the flying device 10 generated by the remaining thrusters 14 and 16 is insufficient. This may make it difficult for the flying device 10 to continue the flight.

In the first embodiment, when the abnormality occurs in the thruster 13, the orientation control unit 44 changes the pitch of the propeller 23 of the thruster 15 in the symmetrical position. As a result, the propulsive force generated by the thruster 15 changes, and the sudden change in the flight orientation of the flying device 10 is avoided. At the same time, the operation of the thruster 15 is maintained, to thereby avoid the generation of excessive propulsive force by the thruster 15 while securing the propulsive force necessary for continuing the flight. As a result, the flying device 10 continues flight while maintaining a stable flight orientation.

When the pitch of the propeller 23 of the thruster 15 is changed in S104, the orientation control unit 44 performs landing of the flying device 10 while maintaining the flight orientation (S105). In other words, the orientation control unit 44 controls the output of the motors 21 and the pitch of the propellers 23 in the remaining normal thrusters 14 and 16 in addition to the thruster 15 which is the symmetrical thruster. The orientation control unit 44 controls the outputs of the motors 21 and the pitch of the propellers 23 in the three thrusters 14, 15, and 16, which operate normally.

As a result, the orientation control unit 44 lowers the flying device 10 while balancing the propulsive forces generated by the three thrusters 14, 15, and 16 that operate normally. In other words, the orientation control unit 44 changes the pitch of the propeller 23 and the output of the motor 21 in the thruster 15 at a position symmetrical to the abnormal thruster 13, thereby balancing the propulsive force in cooperation with the other two thrusters 14 and 16, lowering the altitude of the flying device 10 in a stable orientation, and performing landing.

On the other hand, when it is determined that the flying device 10 is not ascending or hovering in S102 (NO in S102), the orientation control unit 44 stops the motor 21 of the thruster 13 which is the abnormal thruster (S106). The orientation control unit 44 changes the pitch of the propeller 23 in the thruster 15 at the position symmetrical to the thruster 13 to the positive side (S107). When it is determined in S102 that the flying device 10 is not ascending or hovering, the flying device 10 is descending. For that reason, the normal thrusters 14 to 16 generate a propulsive force to the extent that the flying device 10 stably descends.

Therefore, the orientation control unit 44 changes the pitch of the propeller 23 in the thruster 15, which is the symmetrical thruster, to the positive side, thereby avoiding a sudden fall of the flying device 10 or a change in the orientation due to the stop of the thruster 13. As described above, when an abnormality is detected in any of the thrusters 13 to 16 during descent, the orientation control unit 44 changes the pitch of the propeller 23 in the thruster 15 at a position symmetrical to the thruster 13 to the positive side. As a result, the propulsive force generated by the thruster 15, which is the symmetrical thruster, is adjusted by changing the pitch of the propeller 23.

When the pitch of the propeller 23 of the thruster 15 is changed in Step S107, the orientation control unit 44 performs landing of the flying device 10 while maintaining the flight orientation (Step S108). That is, in addition to the thruster 15, the orientation control unit 44 controls the output of the motors 21 and the pitch of the propellers 23 in the remaining normal thrusters 14 and 16. The orientation control unit 44 controls the outputs of the motors 21 and the pitch of the propellers 23 in the three thrusters 14, 15, and 16, which operate normally.

As a result, the orientation control unit 44 continues to descend the flying device 10 while balancing the propulsive forces generated by the three thrusters 14, 15, and 16 that operate normally. In other words, the orientation control unit 44 changes the pitch of the propeller 23 and the output of the motor 21 in the thruster 15 at a position symmetrical to the abnormal thruster 13, thereby balancing the propulsive force in cooperation with the other two thrusters 14 and 16, and executing the lowering of the altitude of the flying device 10 while maintaining the stable orientation.

As described above, in the first embodiment, the pitch of the propellers 23 of the thrusters 13 to 16 is changed by the pitch change mechanism unit 30. When an abnormality is detected in the thruster 13 among the plurality of thrusters 13 to 16, the orientation control unit 44 changes the pitch of the propeller 23 in the remaining normal thrusters 14 to 16. In other words, the orientation control unit 44 changes the pitch of the propeller 23 without stopping the normal thrusters 14 to 16.

As a result, the normal thrusters 14 to 16 whose pitch has been changed change the propulsive force to be generated. As a result, the normal thrusters 14 to 16 secure the propulsive force necessary for continuing the flight, and the orientation change due to the torque imbalance is reduced. Therefore, even if an abnormality occurs in any of the multiple thrusters 13 to 16, stable flight can be continued without stopping the other thrusters.

In the first embodiment, the pitch of the propeller 23 in the thruster 15 at a position symmetrical to the thruster 13 in which the abnormality has occurred is changed. If both of the thruster 13 in which the abnormality has occurred and the thruster 15 which is positionally symmetrical to the thruster 13 are stopped for the purpose of stabilizing the orientation of the flying device 10, the overall propulsive force of the flying device 10 may be insufficient, and continuous flight may be difficult.

Therefore, the pitch of the propeller 23 of the thruster 15 is changed as in the first embodiment, being capable of leveraging the propulsive force generated by the thruster 15. At that time, the pitch of the propeller 23 in the thruster 15 is changed, to thereby reduce a change in the orientation of the flying device 10 by changing the pitch of the propeller 23 while leveraging the propulsive force generated by the thruster 15. Therefore, the flight can be continued while maintaining a stable orientation, and the movement and landing of the flying device 10 to a safe area can be performed.

In the first embodiment, the orientation control unit 44 changes not only the pitch of the propeller 23 in the thruster 15 at the symmetrical position, but also the output of the motor 21 that drives the propeller 23. As a result, a change in the orientation of the flying device 10 due to a stoppage of the thruster 13 in which the abnormality has occurred is also reduced by a change in the output of the motor 21 that drives the propeller 23 of the thruster 15. Therefore, a more stable orientation can be maintained.

In the first embodiment, the orientation control unit 44 increases the output of the motors 21 that drive the propellers 23 not only in the thruster 13 in which the abnormality has occurred and the thruster 15 in the symmetrical position but also in the remaining thrusters 14 and 16. As a result, the propulsive force reduced by the stoppage of the abnormal thruster 13 and the change in the pitch of the propeller 23 in the thruster 15 at the symmetrical position is compensated by an increase in the propulsive force of the remaining thrusters 14 and 16.

Therefore, the flight can be continued while maintaining a stable orientation, and the movement and landing of the flying device 10 to a safe area can be performed. In that case, the pitch of the propellers 23 in the thruster 14 and the thruster 16 may be changed. With a change in the pitch of the propellers 23 in the thruster 14 and the thruster 16, the propulsive forces generated by the normal three thrusters 14, 15 and 16 are adjusted more precisely. Therefore, the flight can be continued with a more stable flight orientation.

Second Embodiment

Figure 8:
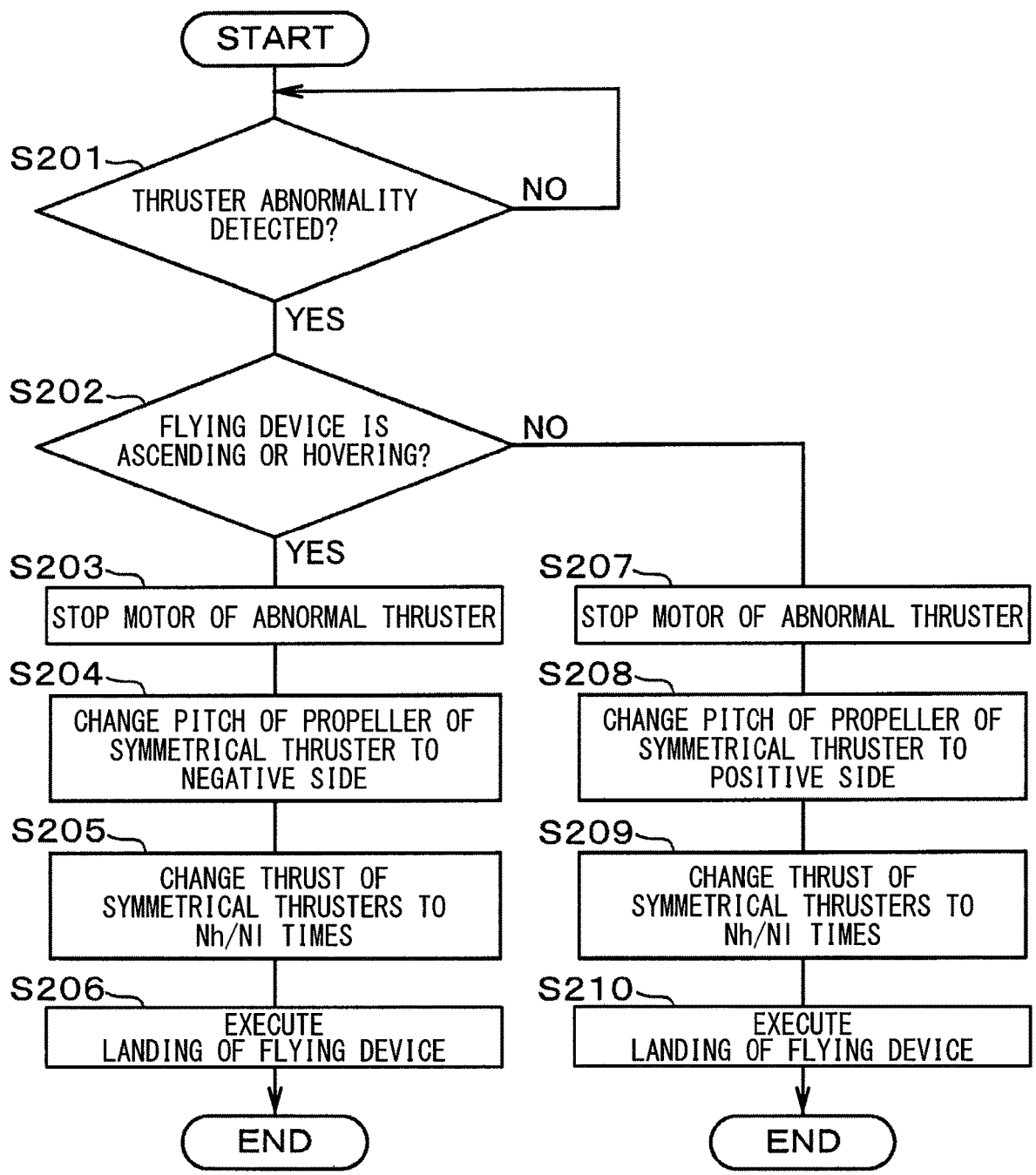
FIG. 8 is a schematic diagram showing a flow of a flight control process in a flying device according to a second embodiment.

FIG. 8 shows a flow of processing of a flying device according to a second embodiment.

A configuration of a flying device 10 according to the second embodiment is the same as that of the first embodiment shown in FIG. 1. In the second embodiment, the flow of the control process of the flying device 10 by the control unit 40 is different from that in the first embodiment. Therefore, in the following description, a description of processing common to the first embodiment will be omitted.

When the flying device 10 is in flight, an abnormality detection unit 43 detects whether or not thrusters 13 to 16 are abnormal (S201). When the abnormality of the thruster 13 is detected by the abnormality detection unit 43 in S201 (YES in S201), the orientation control unit 44 determines whether or not the flying device 10 is ascending or hovering (S202). When the abnormality of the thrusters 13 to 16 is not detected by the abnormality detection unit 43 in S201 (NO in S201), the orientation control unit 44 continues the detection of the abnormality in S201 until the flight of the flying device 10 is completed.

When it is determined that the flying device 10 is ascending or hovering in S202 (YES in S202), the orientation control unit 44 stops a motor 21 of the thruster 13 which is an abnormal thruster (S203). The orientation control unit 44 changes a pitch of the propeller 23 in the thruster 15 at the position symmetrical to the thruster 13 to a negative side (S204). The orientation control unit 44 changes a thrust of the thruster 15 to Nh/Nl times (S205). In other words, the orientation control unit 44 increases the output of the motor 21 of the thruster 15 at a position symmetrical to the thruster 13, and changes the pitch of the propeller 23.

As a result, the orientation control unit 44 changes the thrust generated by the thruster 15 to Nh/Nl times. In this example, Nh is the number of normal thrusters having the propellers 23 rotating in a rotation direction R2 which is an opposite direction to a rotation direction R1 of the propeller 23 of the thruster 13 which is the abnormal thruster. Nl is the number of normal thrusters having the propellers 23 rotating in the rotation direction R1 which is the same direction as the rotation direction R1 of the propeller of the thruster 13 which is the abnormal thruster. In other words, in the case of the second embodiment, the thruster 13, which is the abnormal thruster, and the thruster 15, which is a symmetrical thruster, have the same rotation direction R1 of the propellers 23. On the other hand, in the remaining thrusters 14 and 16, the rotation direction R2 of the propeller 23 is opposite to the direction of the thrusters 13 and 15. As a result, when an abnormality occurs in the thruster 13, Nh becomes "2" which is the number of the thrusters 14 and 16 except for the thruster 15 which is the symmetrical thruster. On the other hand, Nl is "1" because the thruster 15, which is the symmetrical thruster, corresponds to Nl. Therefore, the orientation control unit 44 increases the output of the motor 21 in the thruster 15 which is the symmetrical thruster while changing the pitch of the propeller 23, and changes the thrust of the thruster 15 to Nh/Nl=2/1=2. In other words, the thrust of the thruster 15 is controlled to be twice the thrust generated by the thruster 14 and the thruster 16. Naturally, the value of Nh/Nl varies depending on the number of thrusters included in the flying device 10.

As described above, when an abnormality is detected in any of the thrusters 13 to 16 during ascending or hovering, the orientation control unit 44 changes the pitch of the propeller 23 in the thruster 15 at the position symmetrical to the abnormal thruster 13 to the negative side. Further, the orientation control unit 44 changes the thrust of the thruster 15 to Nh/Nl=2 times. As a result, the propulsive force, that is, the thrust generated by the thruster 15, which is the symmetrical thruster, is adjusted by changing the pitch of the propeller 23 and changing the output of the motor 21.

When the pitch of the propeller 23 of the thruster 15 is changed in S204 and the output of the motor 21 of the thruster 15 is changed in S205, the orientation control unit 44 performs landing of the flying device 10 while maintaining the flight orientation (S206). In other words, the orientation control unit 44 changes the pitch of the propeller 23 and the output of the motor 21 in the thruster 15 at the position symmetrical to the abnormal thruster 13, balances the propulsive force in cooperation with the other two thrusters 14 and 16, lowers an altitude of the flying device 10 in a stable orientation, and performs landing.

On the other hand, when it is determined that the flying device 10 is not ascending or hovering in S202 (NO in S202), the orientation control unit 44 stops the motor 21 of the thruster 13 which is the abnormal thruster (S207). The orientation control unit 44 changes the pitch of the propeller 23 in the thruster 15 at the position symmetrical to the thruster 13 to a positive side (S208). In other words, when it is determined in S202 that the flying device 10 is not ascending or hovering, the flying device 10 is descending. Therefore, the orientation control unit 44 changes the pitch of the propeller 23 in the thruster 15 to the positive side. The orientation control unit 44 changes the thrust generated by the thruster 15 to Nh/Nl times (S209). In other words, in the case of the second embodiment, the orientation control unit 44 changes the thrust of the thruster 15 to Nh/Nl=2 times. In other words, the orientation control unit 44 increases the output of the motor 21 of the thruster 15.

Upon changing the pitch of the propeller 23 of the thruster 15 in S208 and changing the output of the motor 21 of the thruster 15 in S209, the orientation control unit 44 performs landing of the flying device 10 while maintaining the flight orientation (S210). In other words, the orientation control unit 44 changes the pitch of the propeller 23 and the output of the motor 21 in the thruster 15 at the position symmetrical to the abnormal thruster 13, balances the propulsive force in cooperation with the other two thrusters 14 and 16, lowers an altitude of the flying device 10 in a stable orientation, and performs landing.

In the second embodiment described above, the orientation control unit 44 changes not only the pitch of the propeller 23 but also the output of the motor 21 in the thruster 15 at the position symmetrical to the thruster 13 at which the abnormality has occurred. As a result, the orientation control unit 44 changes the thrust generated by the thruster 15. For that reason, the propulsive force reduced by the stoppage of the thruster 13 in which the abnormality has occurred is compensated by increasing the output of the motor 21 in the thruster 15 rotating in the same rotation direction R1 as that of the propeller 23 of the thruster 13. Therefore, the flight can be continued while maintaining a stable orientation, and the movement and landing of the flying device 10 to a safe area can be performed.

Third Embodiment

Figure 9:
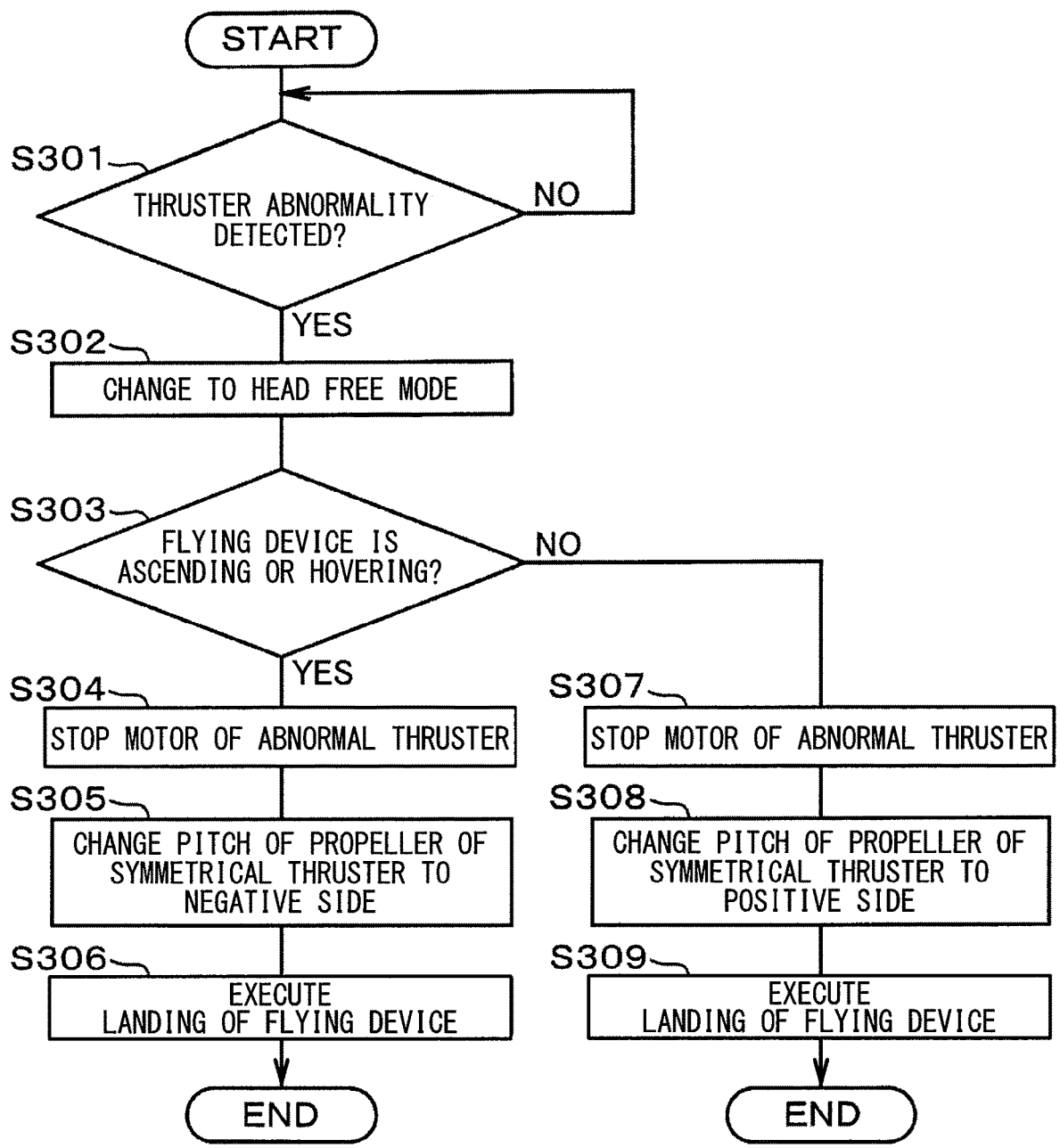
FIG. 9 is a schematic diagram showing a flow of a flight control process in a flying device according to a third embodiment.

FIG. 9 shows a flow of processing of a flying device according to a third embodiment.

A configuration of a flying device 10 according to the third embodiment is the same as that of the first embodiment, similarly to the second embodiment.

When the flying device 10 is in flight, an abnormality detection unit 43 detects whether or not thrusters 13 to 16 are abnormal (S301). When the abnormality of the thruster 13 is detected by the abnormality detection unit 43 in S301 (YES in S301), an orientation control unit 44 changes the flying device 10 to a "head free mode" (S302). The "head free mode" is also referred to as a "head lock mode" or a "headless mode". The flying device 10 shifts to the "head free mode" to fix the front, rear, left, and right at the time of the shift. In other words, since the flying device 10 is rotatable in a yaw axis direction, the front, rear, left, and right are not fixed in a normal state. Therefore, with a change in the flying device 10 to the "head free mode", the front, rear, left, and right of the flying device 10 during flight are fixed to the front, rear, left, and right at the time of the change in S302. When the abnormality of the thrusters 13 to 16 is not detected by the abnormality detection unit 43 in S301 (NO in S301), the orientation control unit 44 continues the detection of the abnormality in S301 until the flight of the flying device 10 is completed.

Figure 7:
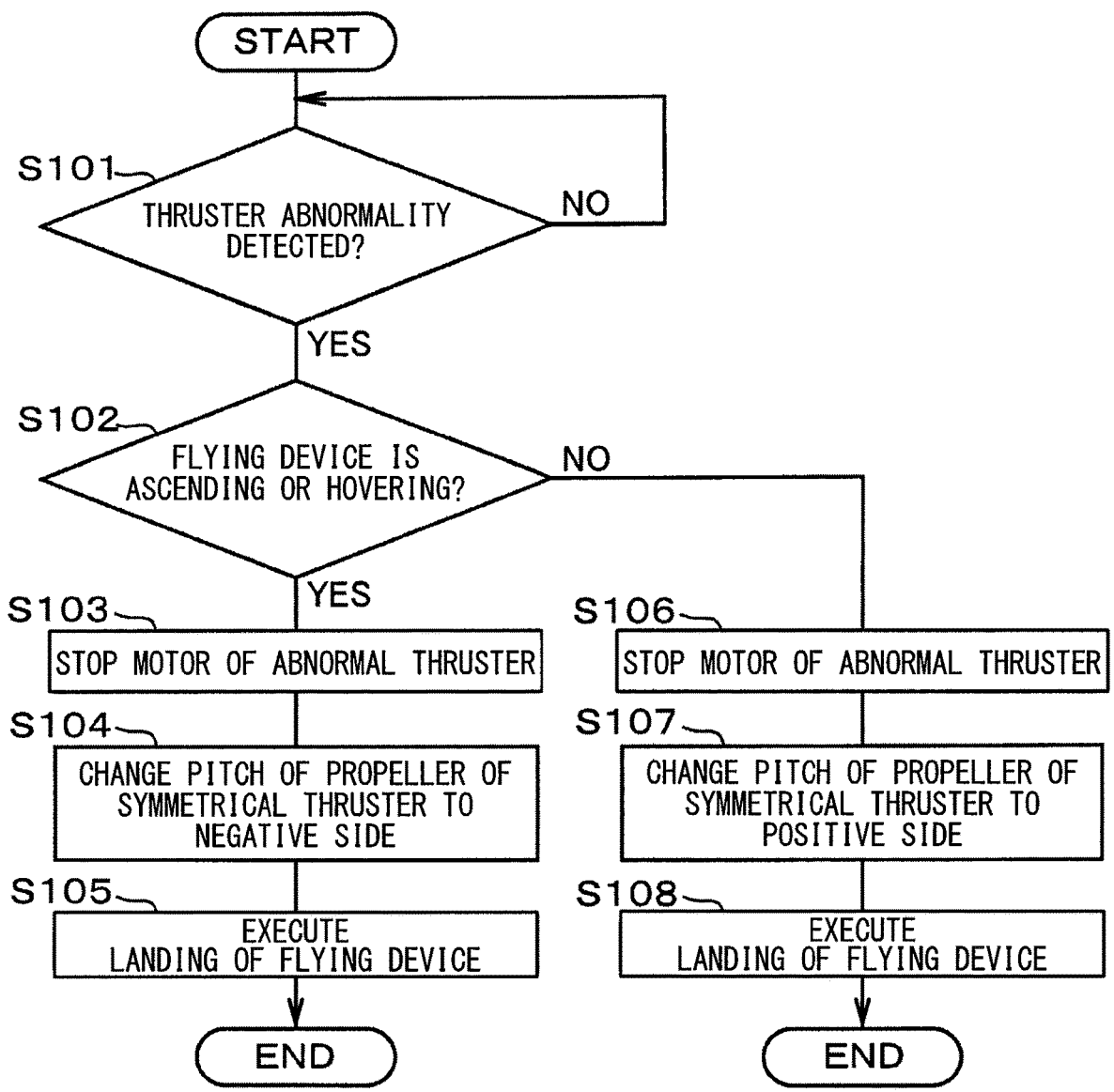
FIG. 7 is a schematic diagram showing a flow of a flight control process in the flying device according to the first embodiment.

After changing to the head free mode in S302, the orientation control unit 44 executes the same processing as that of the first embodiment shown in FIG. 7. In other words, the orientation control unit 44 determines whether or not the flying device 10 is ascending or hovering (S303). The orientation control unit 44 stops the motor 21 of the thruster 13 (S304) when it is determined that the flying device 10 is ascending or hovering in S303 (YES in S303). Then, the orientation control unit 44 changes a pitch of a propeller 23 in the thruster 15 at a position symmetrical to the thruster 13 to a negative side (S305). When the pitch of the propeller 23 of the thruster 15 is changed in Step S305, the orientation control unit 44 performs landing of the flying device 10 while maintaining a flight orientation (S306).

On the other hand, when it is determined that the flying device 10 is not ascending or hovering in S303 (NO in S303), the orientation control unit 44 stops the motor 21 of the thruster 13 (S307). The orientation control unit 44 changes the pitch of the propeller 23 in the thruster 15 to a positive side (S308). When the pitch of the propeller 23 of the thruster 15 is changed in Step S308, the orientation control unit 44 performs landing of the flying device 10 while maintaining the flight orientation (S309).

According to the third embodiment, when an abnormality is detected in any of the thrusters 13 to 16, the orientation control unit 44 changes the flying device 10 to the head free mode. As a result, the front, rear, left, and right of the flying device 10 are fixed to the front, rear, left, and right at the time of changing to the head free mode. Therefore, the front, rear, left, and right can be kept constant regardless of the rotation direction of the flying device 10, and the continuation of the flight to a safe zone and the landing can be stably performed.

The process of changing to the head free mode in the third embodiment may be inserted between S201 and S203 in the second embodiment shown in FIG. 8.

Fourth Embodiment

Figure 10:
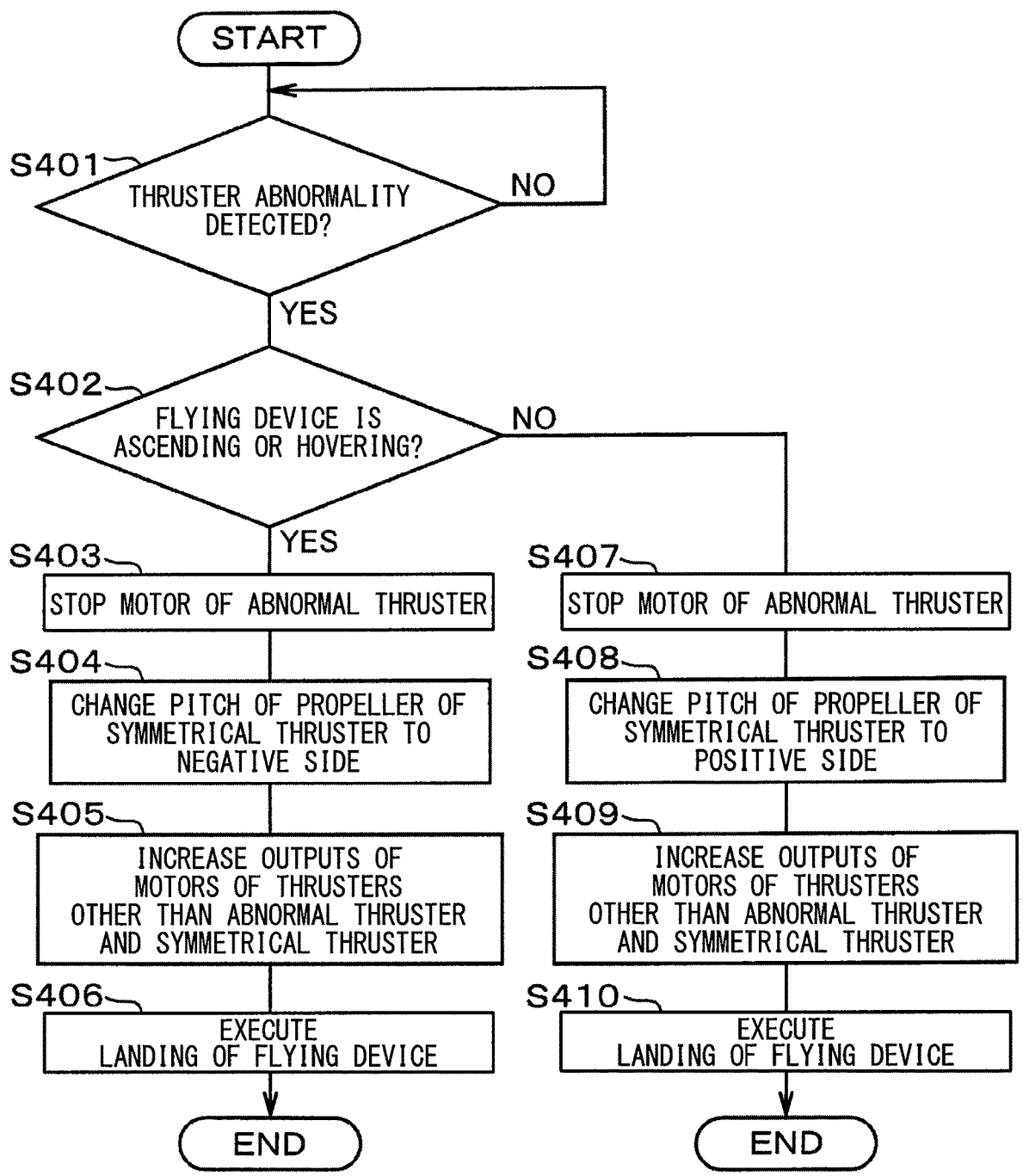
FIG. 10 is a schematic diagram showing a flow of a flight control process in a flying device according to a fourth embodiment.

FIG. 10 shows a flow of processing of a flying device according to a fourth embodiment.

A configuration of a flying device 10 according to the fourth embodiment is the same as that of the first embodiment similarly to the multiple embodiments described above.

When the flying device 10 is in flight, an abnormality detection unit 43 detects whether or not thrusters 13 to 16 are abnormal (S401). An orientation control unit 44 determines whether or not the flying device 10 is ascending or hovering (S402). The orientation control unit 44 stops a motor 21 of the thruster 13 (S403) when it is determined that the flying device 10 is ascending or hovering in S402 (YES in S402). The orientation control unit 44 changes a pitch of a propeller 23 in the thruster 15 at a position symmetrical to the thruster 13 to a negative side (S404).

When the pitch of the propeller 23 of the thruster 15 is changed in Step S404, the orientation control unit 44 increases the output of the motors 21 in the thruster 14 and the thruster 16 except for the thruster 13 and the thruster 15 (S405). In other words, according to the fourth embodiment, the output of the motor 21 in the thruster 14 and the thruster 16 is increased except for the thruster 13 in which the error has occurred and the thruster 15 at a position symmetrical to the thruster 13. As a result, a sudden change in an altitude of the flying device 10, particularly a sudden descent of the flying device 10, due to a stoppage of the thruster 13 in which the abnormality has occurred is avoided. The orientation control unit 44 increases the output of the motors 21 in the thruster 14 and the thruster 16 in Step S405, and then performs landing of the flying device 10 while maintaining a flight orientation (S406).

On the other hand, when it is determined that the flying device 10 is not ascending or hovering in S403 (NO in S403), the orientation control unit 44 stops the motor 21 of the thruster 13 (S407). The orientation control unit 44 changes the pitch of the propeller 23 in the thruster 15 at the position symmetrical to the thruster 13 to a positive side (S408).

When the pitch of the propeller 23 of the thruster 15 is changed in S408, the orientation control unit 44 increases the output of the motors 21 in the thruster 14 and the thruster 16 except for the thruster 13 and the thruster 15 (S409). In other words, according to the fourth embodiment, the output of the motor 21 in the thruster 14 and the thruster 16 is increased except for the thruster 13 in which the error has occurred and the thruster 15 at a position symmetrical to the thruster 13. As a result, a sudden change in an altitude of the flying device 10, particularly a sudden descent of the flying device 10, due to a stoppage of the thruster 13 in which the abnormality has occurred is avoided. The orientation control unit 44 increases the output of the motors 21 in the thruster 14 and the thruster 16 in Step S409, and then performs landing of the flying device 10 while maintaining the flight orientation (S410).

According to the fourth embodiment, after stopping the thruster 13 in which the abnormality has occurred, the orientation control unit 44 increases the output of the motors 21 in the thruster 14 and the thruster 16 except for the thruster 15 which is the symmetrical thruster. As a result, a sudden change in an altitude of the flying device 10, particularly a sudden descent, caused by a decrease in a propulsive force due to a stoppage of the thruster 13 in which the abnormality has occurred is reduced. Therefore, safety can be further enhanced.

The process of increasing the output of the motors 21 in the thruster 14 and the thruster 16 according to the fourth embodiment may be inserted between S205 and S206 and between S209 and S210 in the second embodiment shown in FIG. 8. Further, the process of increasing the output of the motors 21 in the thruster 14 and the thruster 16 according to the fourth embodiment may be inserted between S305 and S306 and between S308 and S309 in the third embodiment shown in FIG. 9, and may be applied to an embodiment in which the second embodiment and the head free mode are combined together.

Fifth Embodiment

Figure 11:
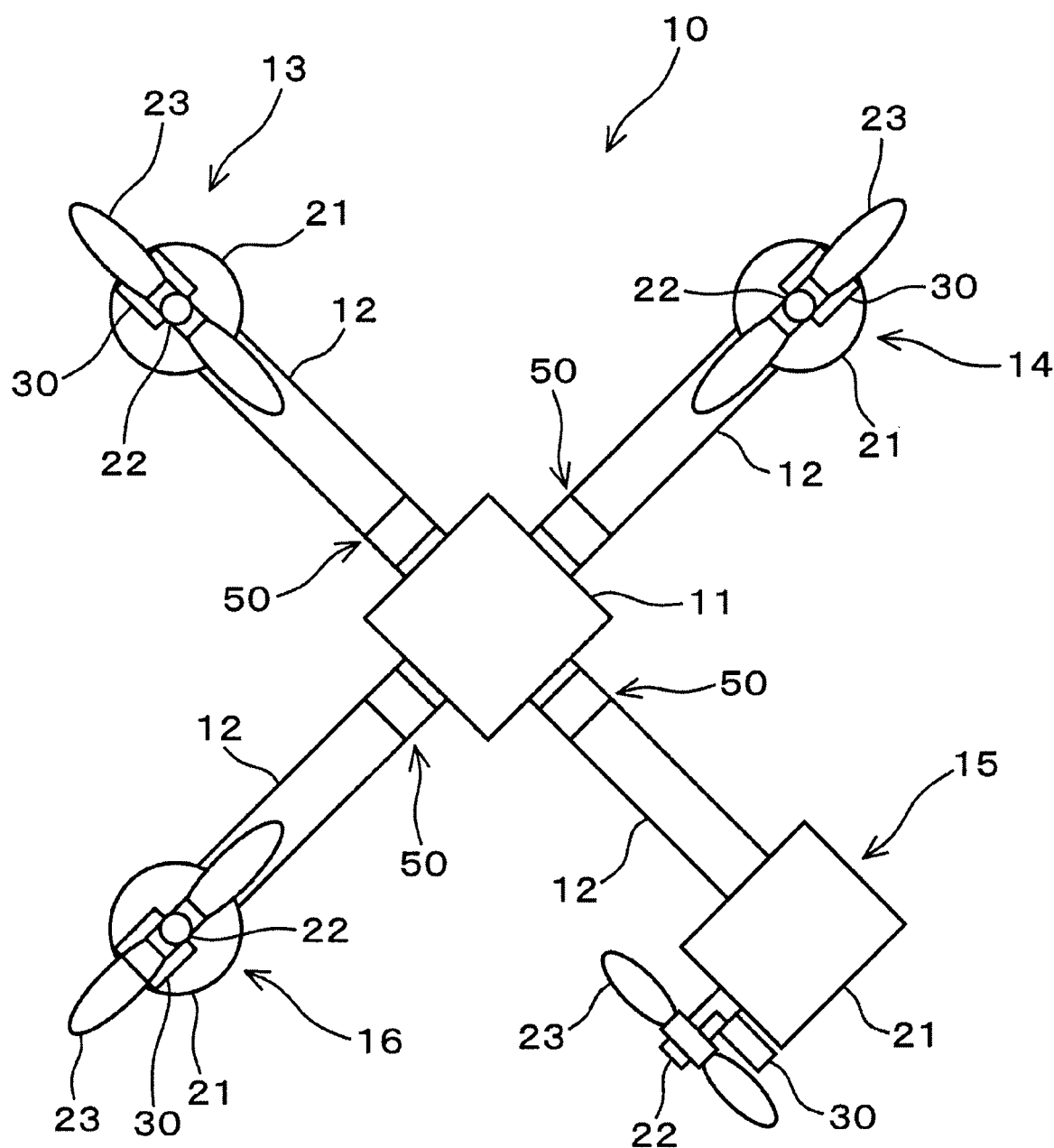
FIG. 11 is a schematic diagram showing a flying device according to a fifth embodiment.

A flying device according to a fifth embodiment is shown in FIG. 11.

A flying device 10 according to the fifth embodiment includes rotation mechanisms 50. The rotation mechanisms 50 are provided on arm portions 12, and rotate thrusters 13 to 16 with respect to a base 11 about virtual axes of the arm portions 12 connecting the base 11 and the thrusters 13 to 16. As a result, the thrusters 13 to 16 provided in the arm portion 12 are rotated with respect to the base 11 by the rotation mechanism 50. As a result, a direction of a propulsive force generated by each of the thrusters 13 to 16 is changed in accordance with the rotation of the thrusters 13 to 16.

Figure 12:
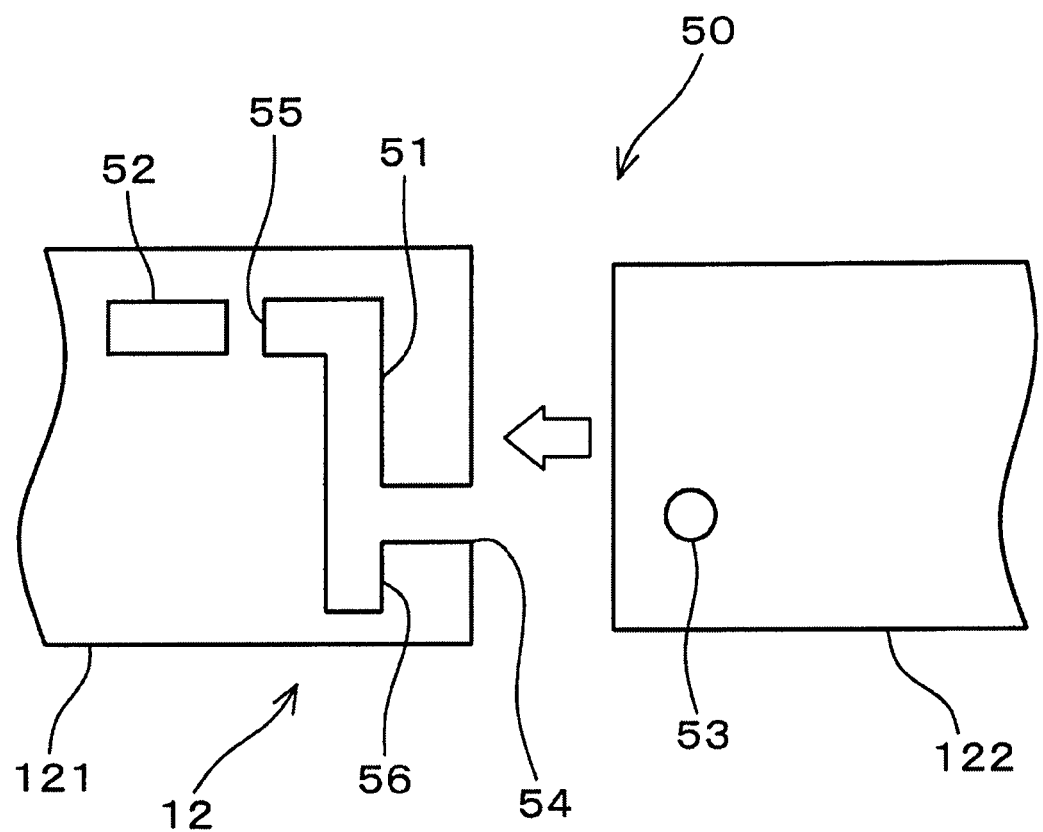
FIG. 12 is a schematic diagram showing a rotation mechanism of the flying device according to the fifth embodiment.

An example of each of the rotation mechanisms 50 will be described with reference to FIGS. 12 to 14. In the case of an example shown in FIGS. 12 to 14, each arm portion 12 is divided into a first arm portion 121 and a second arm portion 122. The first arm portion 121 is connected to the base 11. The second arm portion 122 is connected to the thrusters 13 to 16. The rotation mechanism 50 is provided at a connection portion between the first arm portion 121 and the second arm portion 122.

The first arm portion 121 is formed with a cylindrical tip on the thrusters 13 to 16 side and the second arm portion 122 is inserted inward of the first arm portion 121. The first arm portion 121 has a groove 51 and an extrusion portion 52. The groove 51 penetrates through the cylindrical first arm portion 121 in a radial direction. The groove 51 extends in a circumferential direction of the cylindrical first arm portion 121. The second arm portion 122 is formed in a cylindrical shape or a rod shape, and a tip of the second arm portion 122 on the base 11 side is inserted into the first arm portion 121. The second arm portion 122 has a protrusion portion 53 protruding in the radial direction from an outer wall of the second arm portion 122.

The protrusion portion 53 of the second arm portion 122 is inserted into the groove 51 provided in the first arm portion 121. When the second arm portion 122 is fixed to the first arm portion 121, the protrusion portion 53 of the second arm portion 122 is inserted into an opening 54 of the groove 51. After pushing the second arm portion 122 from the opening 54 toward the base 11, the first arm portion 121 and the second arm portion 122 are relatively rotated in the circumferential direction, so that the protrusion portion 53 of the second arm portion 122 moves upward in FIG. 12 along the groove 51.

Figure 13:
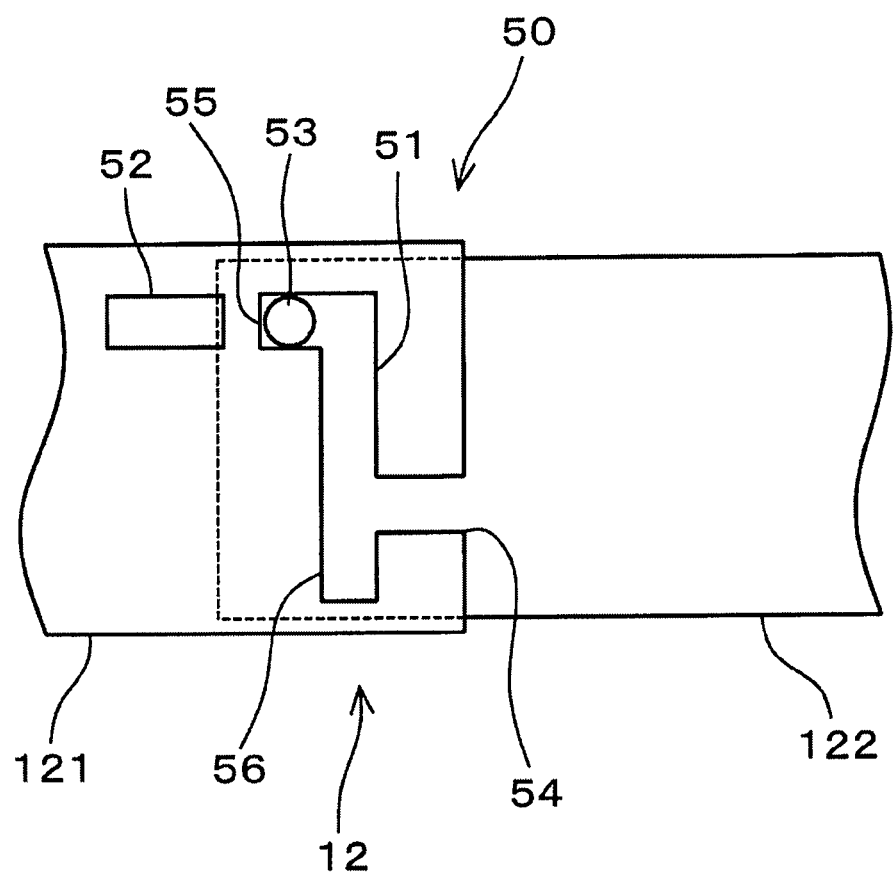
FIG. 13 is a schematic diagram showing the rotation mechanism of the flying device according to the fifth embodiment.

The second arm portion 122 is further pushed toward the base 11, as a result of which the protrusion portion 53 fits into a recess portion 55 connected to the groove 51, as shown in FIG. 13. The recess portion 55 is formed from the groove 51 toward the base 11 side. The first arm portion 121 and the second arm portion 122 are fixed to each other by the protrusion portion 53 fitting into the recess portion 55. In this manner, when the protrusion portion 53 is positioned to fit into the recess portion 55, the propellers 23 of the thrusters 13 to 16 are positioned above the thrusters 13 to 16 as shown in FIGS. 1 and 2. This state is in a normal flight mode of the flying device 10.

On the other hand, when the thrusters 13 to 16 provided on the second arm portions 122 are rotated about the axes of the arm portions 12, the orientation control unit 44 drives the extrusion portions 52. Each of the extrusion portions 52 has, for example, an electromagnetically operated actuator, and reciprocates in an axial direction of the arm portion 12. The extrusion portion 52 is driven toward each of the thrusters 13 to 16 so that the extrusion portion 52 pushes the protrusion portion 53 fitted in the recess portion 55 toward each of the thrusters 13 to 16.

As a result, the protrusion portions 53 fitted in the recess portion 55 are pushed out toward the thrusters 13 to 16, and moves along the groove 51 to a step portion 56. The step portion 56 extends in the circumferential direction from the opening 54 in the groove 51 toward a lower side in FIG. 13. When the protrusion portion 53 is pushed out into the groove 51 by the extrusion portion 52, the second arm portion 122 rotates about the axis of the arm portion 12 by the propulsive force generated by the rotation of the propeller 23 of each of the thrusters 13 to 16.

Figure 14:
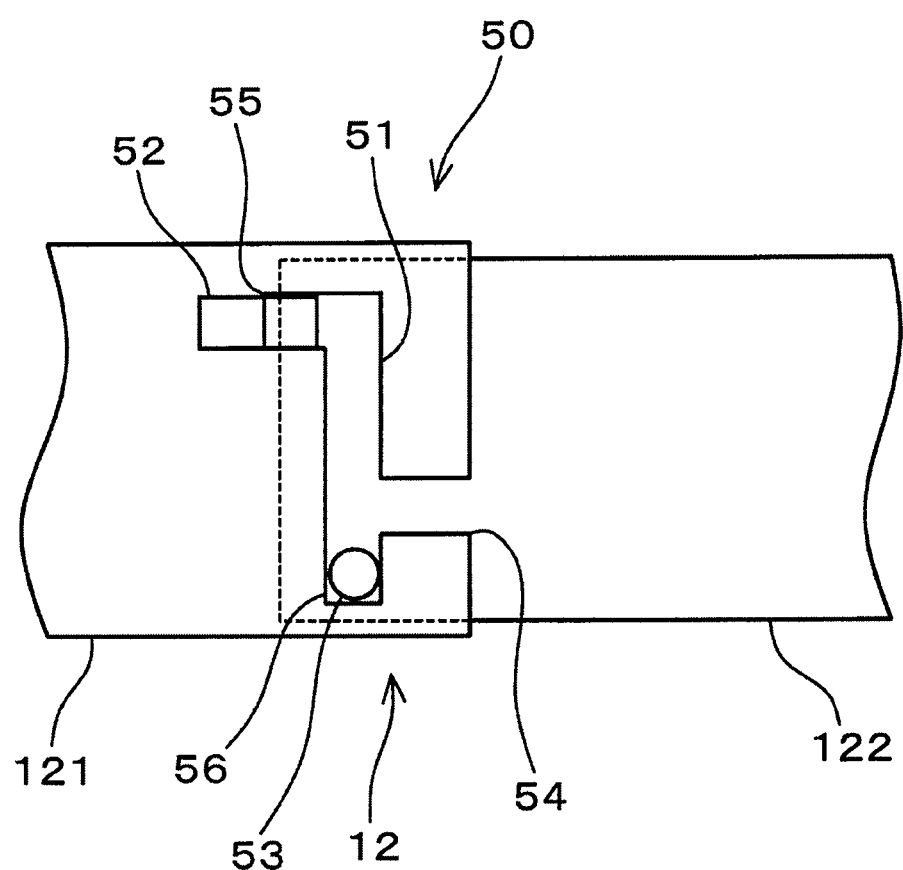
FIG. 14 is a schematic diagram showing the rotation mechanism of the flying device according to the fifth embodiment.

As a result, the protrusion portion 53 of the second arm portion 122 fits into the step portion 56 connected to the groove 51 as shown in FIG. 14, and is fixed in a state in which a rotation angle is defined. The rotation mechanism 50 shown in FIGS. 12 to 14 is an example of a case in which two positions are switched from a normal state shown in FIG. 12 to a rotation state shown in FIG. 14. When the thrusters 13 to 16 are rotated in multiple stages or in no stages with respect to the base 11, a configuration of the rotation mechanism 50 is not limited to the example shown in FIGS. 12 to 14. The rotation mechanism 50 may have any configuration as long as the angles of the thrusters 13 to 16 with respect to the base 11 can be changed about the axis of the arm portion 12.

According to the fifth embodiment, there are provided the rotation mechanisms 50 for rotating the thrusters 13 to 16 with respect to the base 11 about the axes of the arm portions 12. When an abnormality occurs in the thruster 13 shown in FIG. 11, the orientation control unit 44 rotates the thruster 15 at a position symmetrical to the thruster 13 in which the abnormality has occurred. In other words, the orientation control unit 44 rotates the thruster 15 at the position symmetrical to the thruster 13 across the base 11 with respect to the axis of the arm portion 12.

As a result, the propulsive force generated by the thruster 15 changes from a yaw axis direction to an inclined direction. When the abnormal thruster 13 is stopped, a rotational force about the yaw axis is generated in the flying device 10 due to a difference in the rotational direction of the propellers 23 between the thrusters 14 and 16, and the thruster 15. Therefore, the orientation control unit 44 changes the direction of the propulsive force generated by the thruster 15 by changing an angle of the thruster 15 at a position symmetrical to the thruster 13 in which the abnormality has occurred with respect to the base 11. As the thruster 15 rotates, the direction of the propulsive force generated by the thruster 15 is inclined with respect to the yaw axis.

For that reason, the propulsive force generated by the propeller 23 of the thruster 15 acts to cancel a force rotating about the yaw axis generated in the flying device 10 due to a sudden change in the flight orientation due to the stoppage of the thruster 13 and a difference in the rotational direction of the propeller 23. At that time, the orientation control unit 44 finely adjusts the magnitude and direction of the propulsive force generated by the thruster 15 by changing the pitch of the propeller 23 in the thruster 15. As a result, the rotation of the flying device 10 about the yaw axis due to the stoppage of the thruster 13 is canceled by the propulsive force of the thruster 15 inclined with respect to the base 11.

The orientation control unit 44 maintains a stable flight orientation of the base 11 by rotating the thruster 15 with respect to the axis of the arm portion 12 as described above. The orientation control unit 44 controls the pitch of the propellers 23 and the output of the motors 21 in the thruster 14, the thruster 15, and the thruster 16 to continue the flight in the stable orientation of the flying device 10.

According to the fifth embodiment, the rotation mechanisms 50 are provided for rotating the thrusters 13 to 16 relative to the axes of the arm portions 12. As a result, when an abnormality occurs in the thruster 13, the thruster 15 provided at a symmetrical position is rotated with respect to the axis of the arm portion 12. As a result, the direction of the propulsive force generated by the thruster 15 is inclined from the yaw axis direction. As a result, in the flying device 10, a sudden change in the flight orientation due to the stoppage of the thruster 13 and the rotation of the propeller 23 in the yaw axis direction due to the difference in the rotation direction are reduced. Therefore, even if an abnormality occurs in the thruster 13, a stable flight orientation can be maintained without stopping the other thruster 15.

Sixth Embodiment

Figure 15:
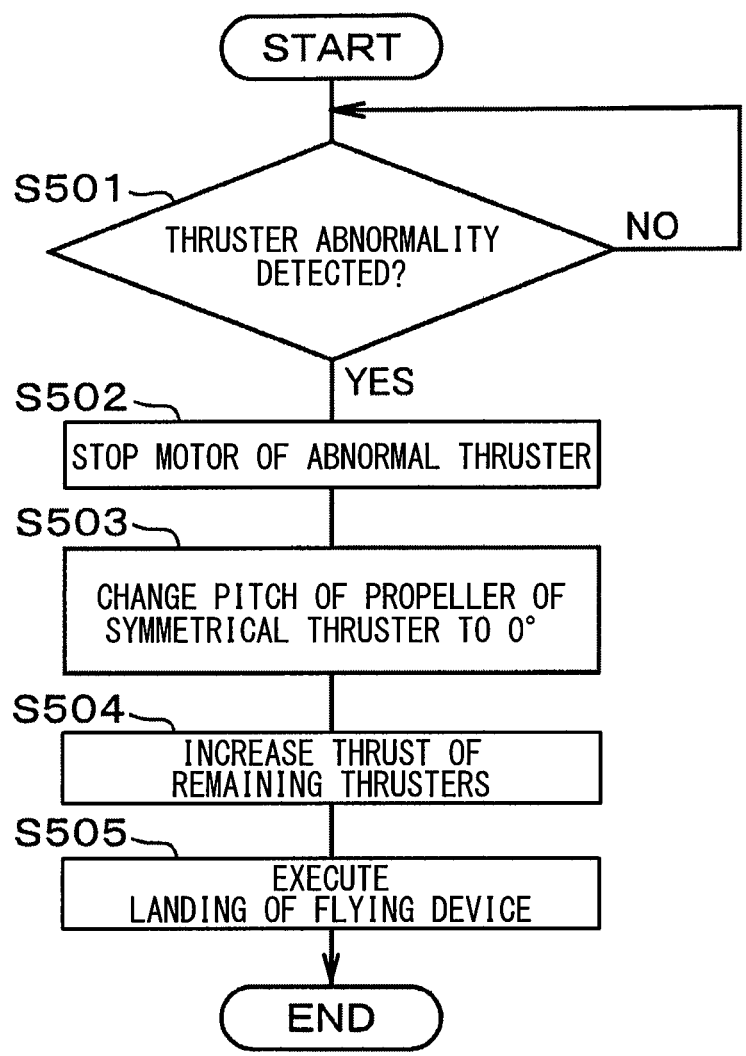
FIG. 15 is a schematic diagram showing a flow of a flight control process in a flying device according to a sixth embodiment.

FIG. 15 shows a flow of processing of a flying device according to a sixth embodiment.

A configuration of the flying device according to the sixth embodiment is the same as that of the first embodiment shown in FIG. 1, similarly to the second embodiment and the like.

When a flying device 10 is in flight, an abnormality detection unit 43 detects whether or not thrusters 13 to 16 are abnormal (S501). When the abnormality of the thruster 13 is detected by the abnormality detection unit 43 (YES in S501), an orientation control unit 44 stops a motor 21 of the thruster 13, which is an abnormal thruster in which the abnormality is detected (S502). The orientation control unit 44 changes a pitch of a propeller 23 in the thruster 15, which is a symmetrical thruster located at a position symmetrical to the thruster 13, to 0° (S503).

As a result, the thruster 15, which is the symmetrical thruster, is at a neutral position in which no propulsive force is generated on either an ascending side or a descending side. The orientation control unit 44 increases the propulsive force of the thruster 14 and the thruster 16, which are the remaining thrusters (S504). In other words, the orientation control unit 44 sets the thruster 14 and the thruster 16 as the remaining thrusters, excluding the thruster 13 which is the abnormal thruster and the thruster 15 which is the symmetrical thruster, from the thrusters 13 to 15. The orientation control unit 44 increases the propulsive force of the thrusters 14 and 16, which are the remaining thrusters. At that time, the orientation control unit 44 sets the propulsive force of the thruster 14 and the thruster 16 to, for example, twice the thrust force when no abnormality occurs in any of the thrusters 13 to 16.

As described above, when an abnormality occurs in any of the thrusters 13 to 16, the orientation control unit 44 stops the thruster 13 in which the abnormality has occurred, and sets the thruster 15 at the position symmetrical to the thruster 13 to a neutral position. In order to compensate for the lack of the thrust due to the stoppage of the thruster 13 and the neutral of the thruster 15, the orientation control unit 44 increases the thrust of the thruster 14 and the thruster 16, which are the remaining thrusters.

In Step S505, when the thrust of the thruster 14 and the thruster 16 is increased, the orientation control unit 44 performs landing of the flying device 10 while maintaining a flight orientation. In other words, the orientation control unit 44 stops the abnormal thruster 13 and sets the thruster 15 at the symmetrical position to be neutral state, and then lowers an altitude of the flying device 10 by the thrust of the remaining thruster 14 and thruster 16 to perform landing.

According to the sixth embodiment described above, the orientation control unit 44 stops the thruster 13 in which the abnormality has occurred, and sets the pitch of the thruster 15 in the symmetrical position to 0° at which no propulsive force is generated. The orientation control unit 44 increases the thrust of the remaining thruster 14 and thruster 16, thereby supplementing the propulsive force due to the stoppage of the thruster 13 and the neutral of the thruster 15, and maintaining the propulsive force necessary for continuation of the flight of the flying device 10. Therefore, the flight can be continued while maintaining a stable orientation, and the movement and landing of the flying device 10 to a safe area can be performed.

Seventh Embodiment

Figure 16:
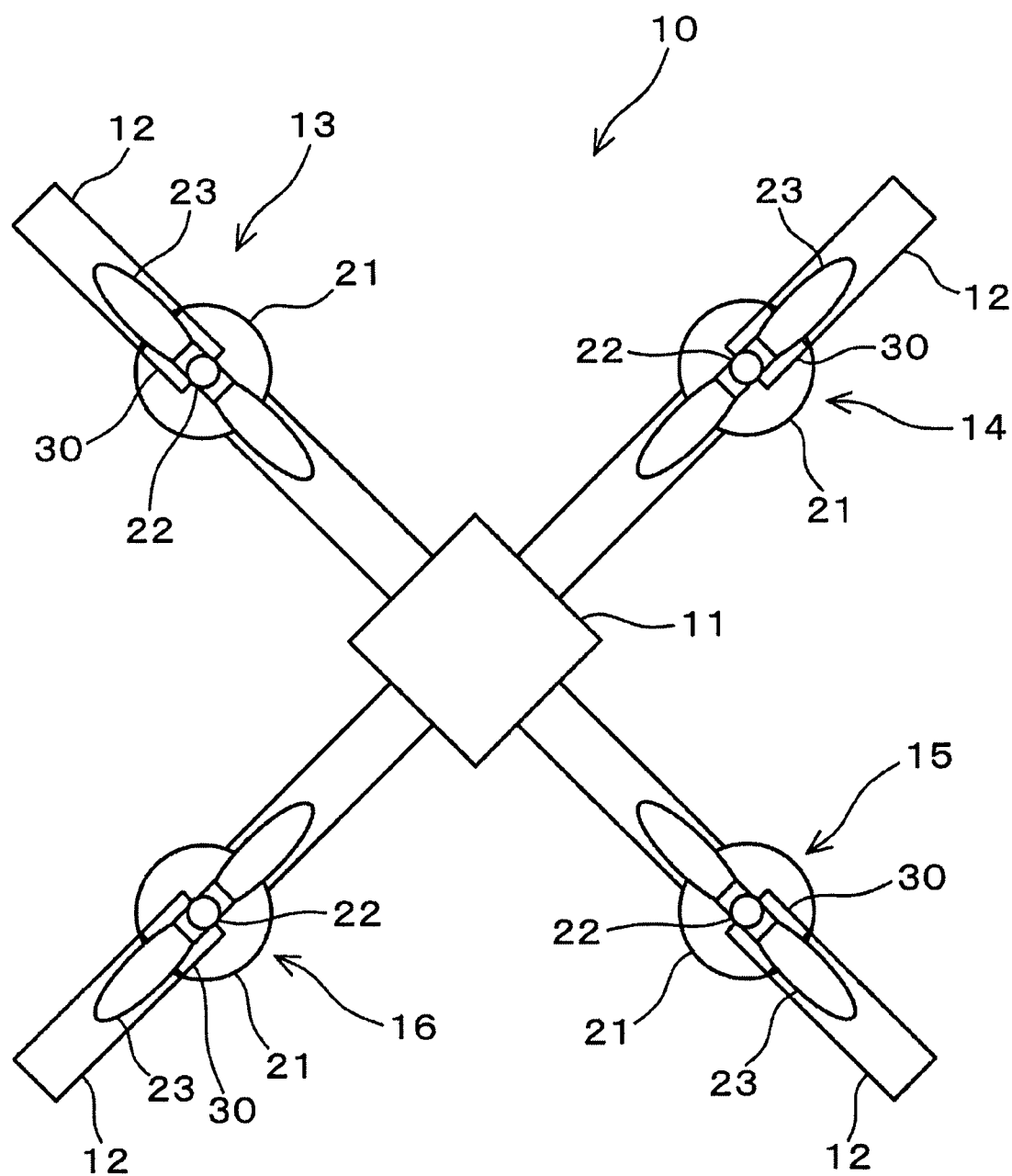
FIG. 16 is a schematic diagram showing a flying device according to a seventh embodiment.

A flying device according to a seventh embodiment is shown in FIG. 16.

Thrusters 13 to 16 of a flying device 10 may be provided in the centers of arm portions 12 as shown in FIG. 16, instead of the tips of the arm portions 12. In other words, the thrusters 13 to 16 are not limited to the tips of the arm portions 12 as shown in FIG. 1 of the first embodiment, and may be positioned closer to the base 11 than the tips of the arm portions 12 as shown in FIG. 16.

Figure 17:
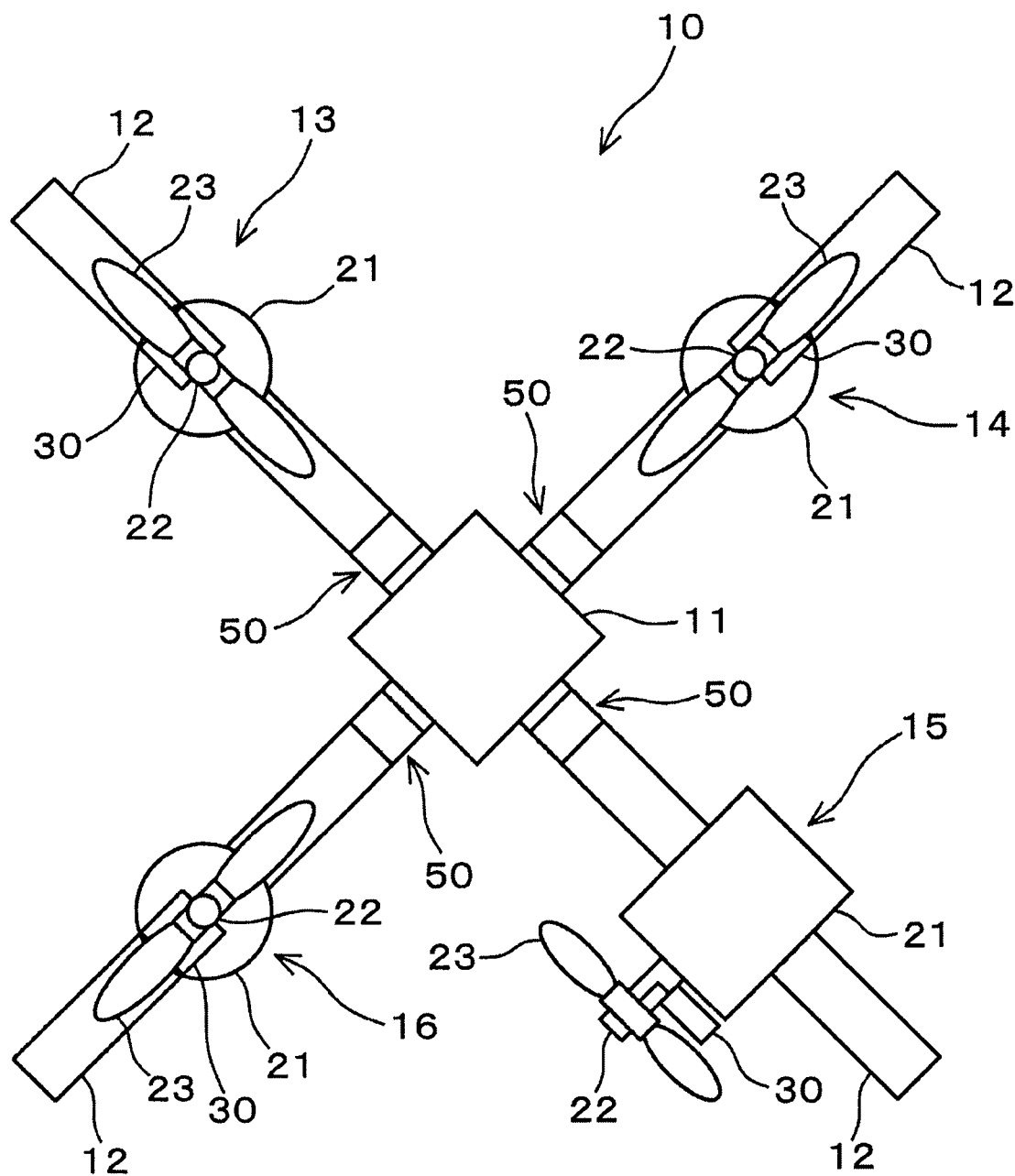
FIG. 17 is a schematic diagram showing the flying device according to the seventh embodiment.

The present disclosure is not limited to the first embodiment, and in the case of the fifth embodiment as well, the thrusters 13 to 16 may be provided in the centers of the arm portions 12 as shown in FIG. 17.

Eighth Embodiment

Figure 18:
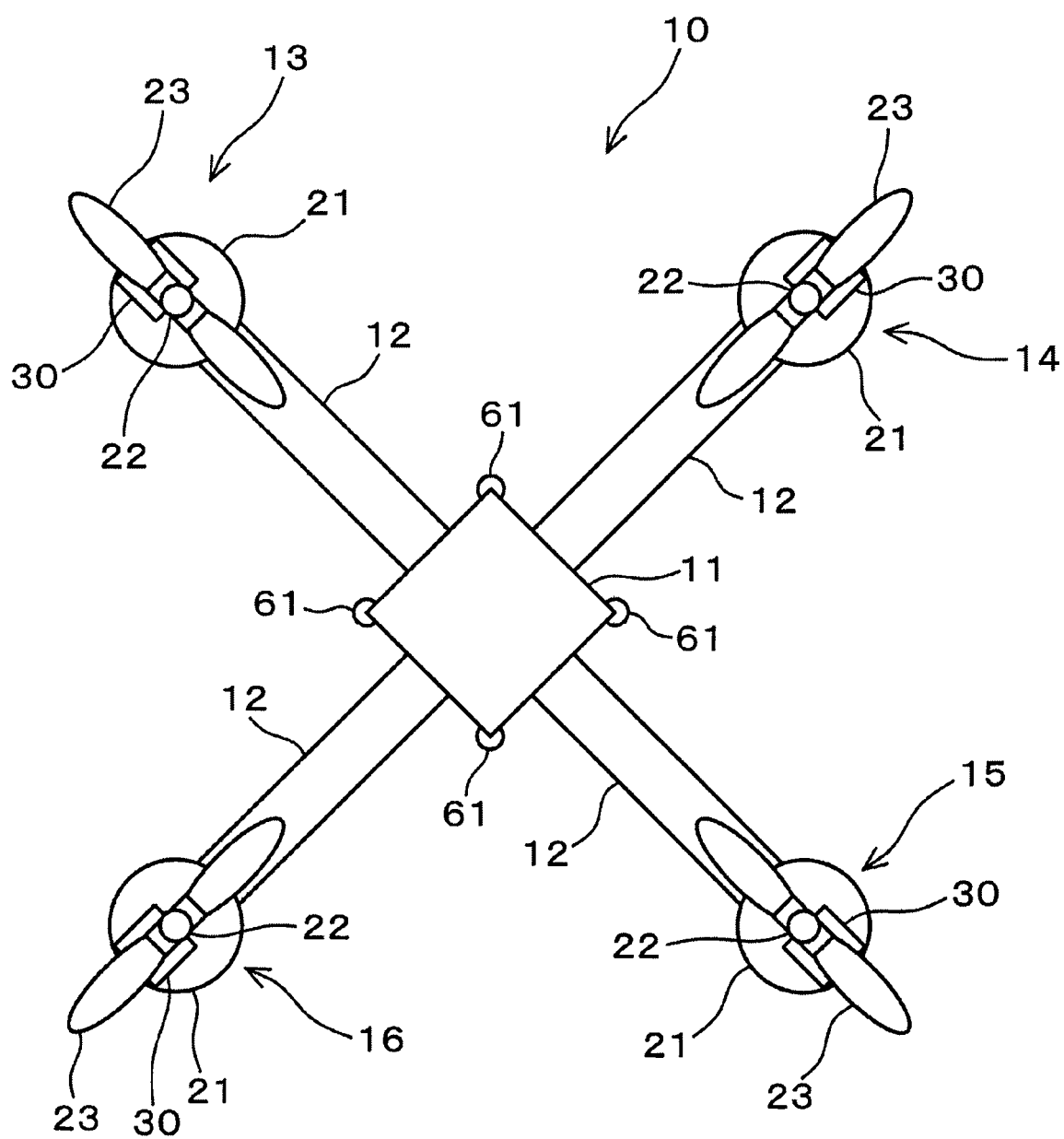
FIG. 18 is a schematic diagram showing a flying device according to an eighth embodiment.

A flying device according to an eighth embodiment is shown in FIG. 18.

A flying device 10 according to the eighth embodiment includes display units 61 on a base 11. Two or more display units 61 are provided in a circumferential direction around a yaw axis penetrating through the base 11. In the case of the eighth embodiment shown in FIG. 18, four display units 61 are provided. The display units 61 are each provided by a light source that is visually recognized, such as an LED. The display units 61 are provided on an outer wall of the base 11, and can be visually recognized by an operator who remotely operates the flying device 10.

In the case of the flying device 10 including the multiple thrusters 13 to 16 as in the embodiments described above, when an abnormality occurs in any of the thrusters 13 to 16, the thruster 13 in which the abnormality has occurred is stopped. Along with the above configuration, the thruster 15 at a position symmetrical to the thruster 13 in which the abnormality has occurred is also stopped or the pitch of the propeller 23 in the thruster 15 is changed under control.

As described above, when the thruster is stopped or the pitch of the propeller 23 is changed due to the abnormality of the thrusters 13 to 16, the flying device 10 may turn around a yaw axis due to the imbalance of the propulsive force or torque of the thrusters 13 to 16. When the flying device 10 is turned in this manner, a traveling direction of the flying device 10 is not kept constant, thereby making it difficult for the operator who performs a remote control to recognize the traveling direction of the flying device 10.

Therefore, in the case of the eighth embodiment, when an abnormality is detected in any of the thrusters 13 to 16 by the abnormality detection unit 43, the control unit 40 sets a virtual traveling direction of the flying device 10. Specifically, the control unit 40 detects the traveling direction of the flying device 10 according to the acceleration sensor 45, the angular velocity sensor 46, the geomagnetic sensor 47, and the like. The control unit 40 sets the detected traveling direction to a front side of the base 11 toward which the flying device 10 flies, that is, a nose side. The control unit 40 turns on the display units 61 located on an opposite side of the set nose side among the multiple display units 61 provided on the base 11.

Generally, the operator of the flying device 10 is located behind the flying device 10. For that reason, the display unit 61 located on the opposite side to the nose side is lighted, to thereby cause the operator to recognize a rear of the base 11 by the display unit 61 and to recognize the traveling direction of the flying device 10. As a result, the operator continues the remote operation of the flying device 10 based on the display of the display unit 61.

According to the eighth embodiment, the flying device 10 includes the display units 61. As a result, even if the flying device 10 is turned with the stoppage of the thrusters 13 to 16 or a change in thrust, the operator can easily recognize the traveling direction of the flying device 10. Therefore, the safe flight can be continued.

The display unit 61 according to the eighth embodiment can be applied to the first to seventh embodiments described above.

Other Embodiments

The present disclosure described above is not limited to the above-described embodiments, and can be applied to various embodiments without departing from the spirit of the present disclosure.

In the multiple embodiments described above, an example in which the pitch of the propellers 23 and the output of the motors 21 in the thrusters 13 to 16 are changed has been described. However, the propellers 23 and the motors 21 of the thrusters 13 to 16 may be configured to controlled for not only the pitch and the output but also rotation direction.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

The invention claimed is:

1. A flying device, comprising:
a base;
a plurality of thrusters provided on the base each including a propeller, a motor which drives the propeller, and a pitch change mechanism unit which changes a pitch of the propeller;
an orientation detection unit that detects an orientation of the base;
an abnormality detection unit that detects an abnormality in at least one of the thrusters; and
an orientation control unit that, when the abnormality detection unit detects the abnormality, changes the pitches of the propellers in the remaining thrusters to maintain an orientation of the base detected by the orientation detection unit, wherein
the thrusters are provided on respective arm portions that extend radially from the base,
an abnormal thruster is defined as a thruster among the plurality of thrusters in which an abnormality has occurred, and
the orientation control unit is configured to change the pitch of the propeller of a symmetrical thruster provided at a position symmetrical to the abnormal thruster or substantially symmetrical to the abnormal thruster across the base.

2. The flying device according to claim 1, wherein the orientation control unit is configured to change the output of the motor of the symmetrical thruster in addition to the pitch of the propeller of the symmetrical thruster.

3. The flying device according to claim 2, wherein the orientation control unit is configured to control a thrust of the symmetrical thruster to be Nh/Nl times, Nh being the number of thrusters with their propeller rotating in an opposite direction to a rotation direction of the propeller in the abnormal thruster, and Nl being the number of thrusters with their propeller rotating in the same direction as the rotation direction of the propeller in the abnormal thruster.

4. The flying device according to claim 2, wherein the orientation control unit is configured to increase the output of the motor in the remaining thrusters aside from the abnormal thruster and the symmetrical thruster.

5. The flying device according to claim 1, further comprising:
a rotation mechanism, wherein
the thrusters are provided on respective arm portions extending radially from the base,
the rotation mechanism is provided on the arm portions, the rotation mechanism being configured to rotate the thrusters with respect to the base about a virtual axis connecting the base and the thrusters, and
when an abnormal thruster is defined as a thruster among the plurality of thrusters in which an abnormality has occurred, the orientation control unit is configured to rotate a symmetrical thruster provided at a position symmetrical to or substantially symmetrical to the abnormal thruster across the base by the rotation mechanism.

6. The flying device according to claim 1, wherein
the thrusters are provided on respective arm portions extending radially from the base, and
when an abnormal thruster is defined as a thruster among the plurality of thrusters in which an abnormality has occurred, the orientation control unit is configured to set the pitch of the propeller in a symmetrical thruster provided at a position symmetrical to or substantially symmetrical to the abnormal thruster across the base to be 0°, and is configured to control a thrust of the remaining thrusters aside from the abnormal thruster and the symmetrical thruster to compensate for the thrust generated by the abnormal thruster and the symmetrical thruster.

7. The flying device according to claim 1, further comprising:
a plurality of display units provided in a circumferential direction of the base that visually display a traveling direction of the base when an abnormality is detected in any one of the thrusters.

8. A flying device, comprising:
a base;
a plurality of thrusters provided on the base each including a propeller, a motor which drives the propeller, and a pitch change mechanism unit which changes a pitch of the propeller;
a sensor fixed to the base configured to detect an orientation of the base; and
a processor coupled to the plurality of thrusters, the processor programmed to:
monitor an operation of the plurality of thrusters to detect an abnormality in at least one of the thrusters, and
upon detecting the abnormality, control the plurality of thrusters to change the pitches of the propellers in the remaining thrusters to maintain an orientation of the base detected by the sensor, wherein
the thrusters are provided on respective arm portions that extend radially from the base,
an abnormal thruster is defined as a thruster among the plurality of thrusters in which an abnormality has occurred, and
the processor is configured to change the pitch of the propeller of a symmetrical thruster provided at a position symmetrical to the abnormal thruster or substantially symmetrical to the abnormal thruster across the base.

9. The flying device according to claim 1, wherein
the orientation control unit is configured to change the pitch of the propeller of the symmetrical thruster such that a propulsive force of the propeller of the symmetrical thruster in an ascending direction decreases when the flying device is ascending or hovering, and
the orientation control unit is configured to change the pitch of the propeller of the symmetrical thruster such that the propulsive force of the propeller of the symmetrical thruster in the ascending direction increases when the flying device is descending.

10. The flying device according to claim 8, wherein
the processor is configured to change the pitch of the propeller of the symmetrical thruster such that a propulsive force of the propeller of the symmetrical thruster in an ascending direction decreases when the flying device is ascending or hovering, and
the processor is configured to change the pitch of the propeller of the symmetrical thruster such that the propulsive force of the propeller of the symmetrical thruster in the ascending direction increases when the flying device is descending.

* * * * *